(12) United States Patent
Adamski et al.

(10) Patent No.: US 12,072,105 B2
(45) Date of Patent: Aug. 27, 2024

(54) COOKING APPARATUS

(71) Applicant: The Magnum Barbeque Company, LLC, Littleton, CO (US)

(72) Inventors: Joseph R. Adamski, Van Nuys, CA (US); Steven Lee Simonson, Littleton, CO (US)

(73) Assignee: THE MAGNUM BARBEQUE COMPANY, LLC, Littleton, CO (US)

( * ) Notice: Subject to any disclaimer, the term of this patent is extended or adjusted under 35 U.S.C. 154(b) by 874 days.

(21) Appl. No.: 17/091,282

(22) Filed: Nov. 6, 2020

(65) Prior Publication Data

US 2021/0131667 A1   May 6, 2021

Related U.S. Application Data

(60) Provisional application No. 62/931,463, filed on Nov. 6, 2019.

(51) Int. Cl.
*F24C 1/04* (2021.01)
*A21B 1/48* (2006.01)
*A21B 3/02* (2006.01)
*A47J 37/04* (2006.01)
*A47J 37/07* (2006.01)
(Continued)

(52) U.S. Cl.
CPC ............. *F24C 1/04* (2013.01); *A21B 1/48* (2013.01); *A21B 3/02* (2013.01); *A47J 37/045* (2013.01); *A47J 37/0709* (2013.01); *A47J 37/0713* (2013.01); *A47J 37/0786* (2013.01); *F24B 5/087* (2013.01); *F24B 13/008* (2013.01); *F24C 1/14* (2013.01); *F24C 15/107* (2013.01); *F24C 15/14* (2013.01)

(58) Field of Classification Search
CPC .. A21B 1/48; A21B 3/02; A47J 37/045; A47J 37/0709; A47J 37/0713; A47J 37/0786; F24B 13/008; F24B 5/087; F24C 1/04; F24C 1/14; F24C 15/107; F24C 15/14
USPC .......................................................... 99/386
See application file for complete search history.

(56) References Cited

U.S. PATENT DOCUMENTS 6,000,389 A * 12/1999 Alpert ................. A47J 37/0713
126/41 R
2011/0268853 A1* 11/2011 Cohen .................... A23B 4/044
426/315

(Continued)

*Primary Examiner* — Dana Ross
*Assistant Examiner* — Joseph W Iskra
(74) *Attorney, Agent, or Firm* — Concept IP LLP; Pejman Yedidsion

(57) ABSTRACT

A cooking apparatus having a cooking chamber, a cooking drawer, a solid fuel support drawer, gas burners, and an ash drawer. One of the cassettes positionable in the cooking drawer can be a belt conveyor which can transport food between end doors of the cooking chamber. A front door of the chamber, when open, allows for the cooking drawer with a partially-cooked food item to be removed and moved to another location for inspection/manipulation of the food item, and then returned to the cooking chamber. Infrared burners on the ceiling of the cooking chamber are directed down to the cooking drawer. Hot exhaust gases in the cooking chamber pass through the housing to a top area for food cooking/warming. A flickering flame assembly creates flickering flames in the back of the chamber which are visible from both the front and the back of the cooking apparatus.

13 Claims, 32 Drawing Sheets

(51) Int. Cl.
*F24B 5/08* (2006.01)
*F24B 13/00* (2006.01)
*F24C 1/14* (2021.01)
*F24C 15/10* (2006.01)
*F24C 15/14* (2006.01)

(56) References Cited

U.S. PATENT DOCUMENTS

2018/0177199 A1* 6/2018 Pitlor .................. A21B 1/26
2019/0274315 A1* 9/2019 Newhouse ............ A21B 1/26

* cited by examiner

1190

PRIMARY ELECTRONIC CONTROL FUNCTIONS:

Bake - ON/OFF TO TEMPERATURE FOR TIME PERIOD

Broil - ON/OFF TO TEMPERATURE FOR TIME PERIOD

Belt Motor - ON/OFF

Belt Speed (either sent from control as [0..24VDC] or from potentiometer)

Fireplace Burner - ON/OFF

Clean - ALTERNATE BAKE AND BROIL TO TEMPERATURE, HOLD FOR TIME

FIG. 25A

COOKING APPARATUS

CROSS-REFERENCE TO RELATED APPLICATIONS

This application claims priority to and the benefit of U.S. Provisional Patent Application No. 62/931,463, filed Nov. 6, 2019, the contents of which are hereby incorporated by reference herein for all purposes.

TECHNICAL FIELD

Embodiments relate generally to a cooking apparatus, and more particularly to a barbecue for separate modes of cooking.

BACKGROUND

Barbecues are common outdoor cooking equipment found in many residential backyards. Barbeques operate on various fuel types, such as natural gas, propane gas, logs or wood pellets, coal or charcoal. Cooking is performed in a sometimes closed, sometimes open, cooking chamber comprised of a hinged hood and firebox.

Barbequed food items are typically placed on a support means, such as cast iron or thick wire grates, for a period of time in the cooking chamber. To facilitate heat transfer and cooking of both sides of the food product, the operator can lift open the hinged hood and then reach in and flip the food product over. In addition to releasing heat to the ambient when flipping, the cook must reach over the heated grates (which can be engulfed in flames from ignited grease and oils) to check doneness of hamburgers, hotdogs or the like at the back of the chamber, and flip/turn them if needed.

SUMMARY

According to an aspect of the present disclosure provided herein is a cooking apparatus which includes: a housing; a conveyor belt drawer movable between open and closed positions relative to the housing; the conveyor belt drawer including a conveyor belt configured to transport a food item thereon from one end of the drawer to another; and a gas-fired burner under the conveyor belt drawer.

According to an aspect of the present disclosure provided herein is a cooking apparatus which includes: a housing; a heat source in the housing; a drawer supported by the housing and positionable between an inserted position and a removed position; and a conveyor belt operatively positionable in the drawer and configured to convey a food item supported thereon when the drawer is in the inserted position so that the food item can be heated by the heat source and the food item can be inspected when the drawer is in the removed position outside of the housing.

According to an aspect of the present disclosure provided herein is a cooking apparatus which includes: a housing; a cooking drawer positionable in the housing; a heat source in the housing and configured to heat a food item on the cooking drawer; the heat source including a solid fuel support configured to support wood or solid fuel in a position below the drawer; a solid fuel support drawer in the housing and in which the solid fuel support is positioned; and an ash drawer positioned below the solid fuel support and configured to receive ashes created by burning of wood or solid fuel when on the surface and to control draft air in the housing for combustion of the wood or solid fuel.

According to an aspect of the present disclosure provided herein is a cooking apparatus which includes: a housing having a cooking chamber; a heat source in the housing; a cooking drawer supported by the housing and positionable between an inserted position and a removed position in the cooking chamber; the cooking drawer being configured to support a food item such that when the drawer is in the inserted position the food item can be heated by the heat source and when the drawer is in the removed position the food item can be inspected at a location away from the housing; and a swing-up door positionable in a vertical closed position and an alternative swung-up position wherein the cooking drawer can be removed from the housing.

According to an aspect of the present disclosure provided herein is a cooking apparatus which includes a housing having a cooking chamber; a heat source in the housing; a cooking drawer supported by the housing and positionable between an inserted position and a removed position; first and second different cassettes selected from the group of transport belt, temperature-controlled pizza stone, rotisserie, hot-dog-cooking roller set, walking beam conveyor, narrow spaced conveyor belt configured for smoking and cooking fish and shrimp, and a two-section dual-speed conveyor belt, all of which are motor-driven; and the first and second different cassettes being alternatively drop-in insertable, for different types of cooking operations, into the drawer and configured such that when a food item is positioned in an operative position on the cassette inserted into the drawer and the drawer is in the inserted position, the heat source can cook the food item supported by and moved by the cassette and relative to the heat source.

According to an aspect of the present disclosure provided herein is a cooking apparatus which includes: a housing having a cooking chamber; a heat source in the housing; a cooking drawer supported by the housing and positionable between an inserted position and a removed position; the cooking drawer being configured to position a food item in a cooking position to be cooked by the heat source with the drawer in the inserted position; an input or output tray extending out from a side of the housing adjacent to an end of the cooking chamber; an enclosure extending out from the side and spaced a distance above the tray and supporting a light source positioned to illuminate an object supported by the tray; and a side door at an inlet side of the cooking chamber and positioned between the tray and the enclosure and movable between an open position communicating with the cooking chamber allowing a food item to be inserted into or removed from the cooking drawer and a closed position.

According to an aspect of the present disclosure provided herein is a cooking apparatus which includes: a housing having a cooking chamber; a food support positionable in the cooking chamber; a heat source in the housing and configured to heat food supported by the food support; a transparent front window at a front of the chamber; a transparent back window at a back of the chamber; a flickering fireplace flame generating assembly positioned at a back side of the cooking chamber and thermally separated from a cooking area of the cooking chamber by a glass panel; and the generating assembly including a flame burner and a slot above the burner through which flames from the flame burner pass such that the flames can be viewed through the front window and through the back window.

According to an aspect of the present disclosure provided herein is a cooking apparatus which includes: a housing having a cooking chamber; a food support in the cooking chamber; a heat source configured to heat food supported by the food support; a front window at a front of the chamber; and an end door at an end of the cooking chamber and positionable in alternative closed and opened positions.

According to an aspect of the present disclosure provided herein is a cooking apparatus which includes: a housing having a cooking chamber; a heat source in the housing to heat the cooking chamber; a food support drawer positionable between an inserted position and a removed position relative to the housing; a conveyor belt supported in the drawer; a pizza stone configured to be supported on the conveyor belt and to be heated by the heat source with the drawer in the inserted position; and a motor configured to drive the conveyor belt and a controller configured to control the motor.

According to an aspect of the present disclosure provided herein is a cooking apparatus which includes: a housing having a cooking chamber; a cooking drawer positionable between an inserted position in the cooking chamber and a pulled-open position relative to the housing; a conveyor belt in the cooking drawer and configured to support a food item and move the food item across the drawer in a cooking operation with the drawer in the inserted position; a bake burner positioned below the conveyor belt to heat the cooking chamber; and. a solid fuel support above the bake burner and below the conveyor belt.

According to an aspect of the present disclosure provided herein is a cooking apparatus which includes: a housing having a cooking chamber; a cooking drawer positionable between an inserted position in the cooking chamber and a pulled-open position relative to the housing; a heat source in the housing configured to heat a food item supported by the drawer with the drawer in the inserted position; the heat source includes a solid fuel drawer positionable between inserted and pulled-out positions relative to the housing; the heat source includes a burner positioned below the solid fuel drawer; and an ash drawer below the solid fuel drawer and positionable between inserted and pulled-out positions relative to the housing.

According to an aspect of the present disclosure provided herein is a cooking apparatus which includes: a housing having a cooking chamber; a drawer configured to support a food item in a cooking position in the cooking chamber; a heating assembly in the housing and including burners and a solid fuel support; the heating assembly being configured to provide first, second, third and fourth different and alternative cooking modes wherein: (a) the first cooking mode includes the burners together with ambient air being a primary source of heat for cooking the food item and the solid fuel support not being operatively positioned in the housing; (b) the second cooking mode includes the solid fuel support being operatively positioned in the housing and hot temperature air from the burners flowing through the solid fuel support to create a combination of cooking energy from the hot combustion air from the burners and infrared radiation from the heated solid fuel support; (c) the third cooking mode includes the solid fuel support being operatively positioned in the housing and supporting solid fuel and one or more of the burners igniting the solid fuel sufficiently to create and hold a predetermined temperature in the cooking chamber and when the heating value of the solid fuel is exhausted, the burners are recalled to provide sufficient heat to make up for the solid fuel heat loss; and (d) the fourth cooking mode includes the solid fuel support being operatively positioned in the housing, supporting solid fuel and enclosed such that the solid fuel when ignited produces smoke to impart smoke flavor to the food item.

According to an aspect of the present disclosure provided herein is a cooking method which includes: cooking, at least partially, a food item supported by a drawer in a cooking chamber of a housing; removing the drawer with the at least partially-cooked food item thereon from the housing; transporting the removed drawer to another location; inspecting and/or manipulating the at least partially-cooked food item in the drawer at the another location; and after the inspecting and/or manipulating, inserting the drawer with the at least partially-cooked food item thereon back into the housing.

According to an aspect of the present disclosure provided herein is a pizza cooking method which includes: transporting a pizza stone from an end of a heating chamber to a central location; preheating the pizza stone at the central location; returning the preheated pizza stone to the end; positioning a pizza on the preheated pizza stone at the end; first moving the preheated pizza stone with the pizza thereon to the central location; cooking the pizza at the central location; and second moving the pizza stone with the cooked pizza thereon to an end of the cooking chamber.

According to an aspect of the present disclosure provided herein is a cooking apparatus which includes: a housing having a cooking chamber; a cooking drawer positionable in the housing; a heat source in the housing and configured to heat a food item on the drawer and in the cooking chamber; and a heating area above the cooking chamber and configured to use exhaust from the cooking chamber to heat a food item thereat.

According to an aspect of the present disclosure provided herein is a cooking assembly which includes: a drawer frame having an open bottom and an open top; a conveyor belt cassette positioned in the frame; and at least one retainer member holding the cassette in the frame.

According to an aspect of the present disclosure provided herein is a cooking apparatus which includes: a housing; a cooking chamber in the housing; the cooking chamber including a front glass window, a rear glass window, a glass shield panel at a rear of the cooking area of the cooking chamber and spaced inwardly from the rear glass window to define a fireplace flame chamber; a fireplace frame generating assembly to generate flickering fireplace flames in the flame chamber, such that the flames being visible from a front of the cooking chamber through the front glass window and the glass shield panel, and from a back of the cooking chamber through the rear glass window; and the glass shield panel thermally insulating a cooking area of the cooking chamber area from the fireplace flame chamber.

According to an aspect of the present disclosure provided herein is a cooking apparatus which includes: a housing having a cooking chamber; a solid fuel support drawer below the cooking chamber and carrying a solid fuel support member; parallel first and second straight line gas burners positioned underneath the solid fuel support member; the fuel support member having openings through which gas from the straight line burners can pass to ignite solid fuel on the fuel support member; and an ignition source controlled to be able to independently ignite the first and second burners dependent on at least one of time or temperature.

According to an aspect of the present disclosure provided herein is a cooking assembly which includes: a solid fuel drawer including a drawer frame and a solid fuel support supported in the drawer frame; first and second straight line gas burners below the solid fuel support; the solid fuel drawer being configured to slide horizontally relative to the gas burners; and a manifold assembly including a pressurized manifold, a first valve configured to control gas flow from the pressurized manifold to the first gas burner, and a second valve configured to control gas flow from the pressurized manifold to the second gas burner.

According to an aspect of the present disclosure provided herein is a cooking apparatus which includes: a housing having a cooking chamber; a cooking drawer in the cooking chamber; a heat source in the housing and below the cooking drawer to cook food on the drawer; the cooking chamber including a front parallel lift door which is positionable in a closed position for a cooking operation on food supported by the cooking drawer when in an inserted position in the housing and in an alternative open position wherein the cooking drawer can be removed from and inserted into the housing; the cooking chamber including a first drop-down side door positionable in an open position for a first cooking operation and in a closed position for a different second cooking operation; and the cooking chamber including an opposing second drop-down side door positionable in an open position for the first cooking operation and in a closed position for the different second cooking operation.

According to an aspect of the present disclosure provided herein is a cooking apparatus which includes: a housing; a cooking chamber in the housing; an input door at one end of the cooking chamber; an output door at an opposite end of the cooking chamber; a conveyor belt in the cooking chamber and configured to transport a food item thereon from the input door to the output door; a heat source in the housing and configured to cook the food item on the conveyor belt; and a cooking area on a top of the housing above the cooking chamber and which is heated by hot exhaust air from the cooking chamber passing up through the cooking area to heat food items at the cooking area.

According to an aspect of the present disclosure provided herein is a computerized control system for a cooking apparatus having a housing, a cooking chamber in the housing, a drawer containing a conveyor belt driven by a motor, the drawer being movable between movable between an inserted position below the cooking chamber and a pulled-out position relative to the housing, a gas burner underneath the conveyor belt when the drawer is in the inserted position, and an infrared burner at a top of the cooking chamber, the system including: (a) a belt drive relay to control the motor; (b) a bake drive relay to control the gas burner; and (c) a broil burner relay to control the infrared burner.

According to an aspect of the present disclosure provided herein is a cooking apparatus which includes: a housing having a cooking chamber; the cooking chamber having a first end and an opposite second end; a conveyor belt in the housing and configured to transport a food item in the cooking chamber in a cooking operation to and/or from the first end and/or to and/or from the second end; an input or output tray extending out from a side of the housing adjacent to the first end of the cooking chamber; an enclosure extending out from the side and spaced a distance above the tray and supporting a light source positioned to illuminate an object supported by the tray; and a side door at the first end of the cooking chamber and positioned between the tray and the enclosure and movable between an open position communicating with the cooking chamber allowing a food item to be inserted into or removed from the conveyor belt and a closed position. (For this cooking operation a front door of the cooking chamber can be in an open position.)

According to an aspect of the present disclosure provided herein is a cooking apparatus which includes: a housing having a cooking chamber; temperature-controlled bake burners below the cooking chamber to heat the cooking chamber from below; electronic ignitor for igniting the bake burners independently of one another; broil burners above the cooking chamber to heat the cooking chamber from above; and electronic self-cleaning control configured to receive a self-cleaning time period and to alternately energize the bake burners and the broil burners until a desired self-clean temperature is reached in the cooking chamber, to operate the bake burners and/or the broil burners after the desired self-clean temperature is reached to maintain the temperature, and to shut down the bake and broil burners.

Further objects and advantages of the present disclosure will become apparent from a consideration of the drawings and ensuing description.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 25A is chart listing the primary electronic control functions;

DETAILED DESCRIPTION

A cooking apparatus (a barbecue) of the present disclosure is shown generally at 100 in FIGS. 1-4, for example. Referring thereto, the cooking apparatus 100 can include a cooking drawer shown generally at 110 and which can be inserted into an operative cooking position in the cooking chamber 120 of the housing 130. The cooking drawer 110 can be removed entirely from the housing and carried to another location, such as an indoor or outdoor counter. At the removed location the cooking food in the drawer 110 can be carefully inspected to determine whether further cooking thereof is needed. And if further cooking is needed, the drawer 110 with the food item thereon can be reinserted back into the housing 130 for further cooking. This inspection is advantageously performed at a removed location away from the smoke, heat and flames of the cooking apparatus 100. The location can also have better lighting than inside the cooking apparatus 100.

Figure 1:
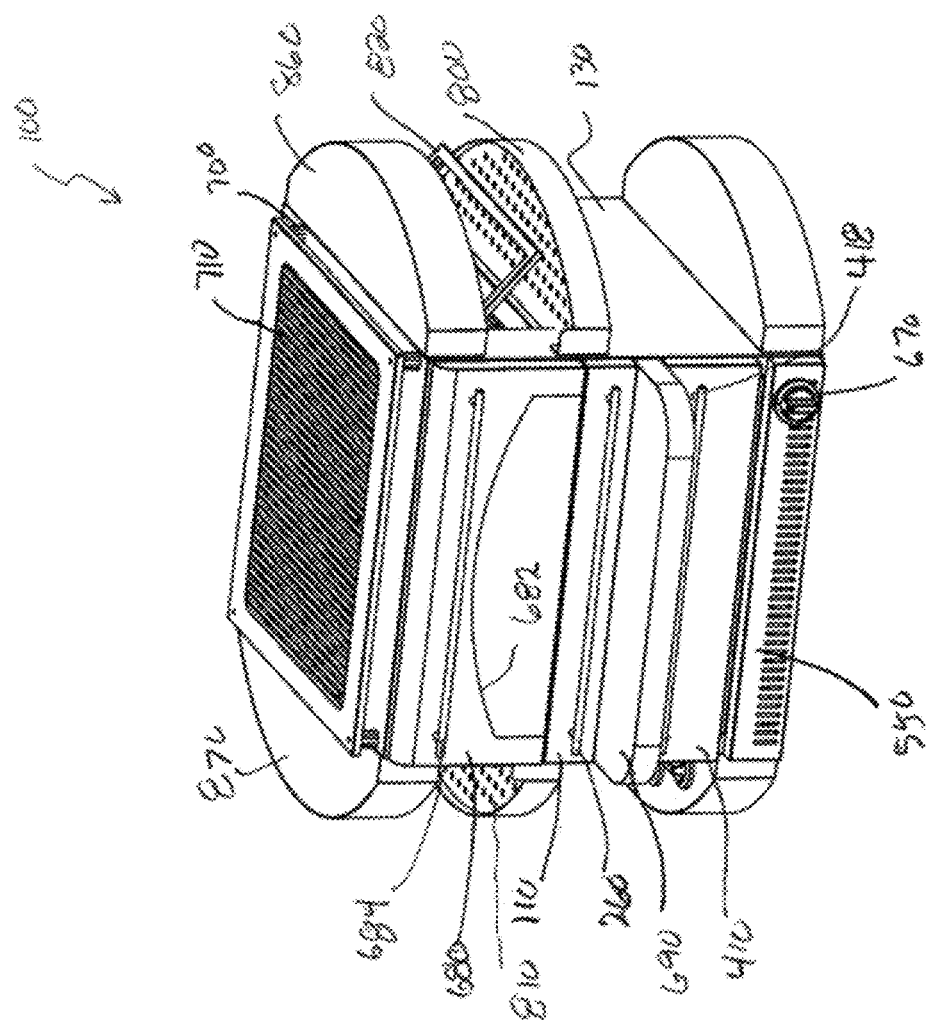
FIG. 1 is a top perspective view of a cooking apparatus of the present disclosure.
Figure 2:
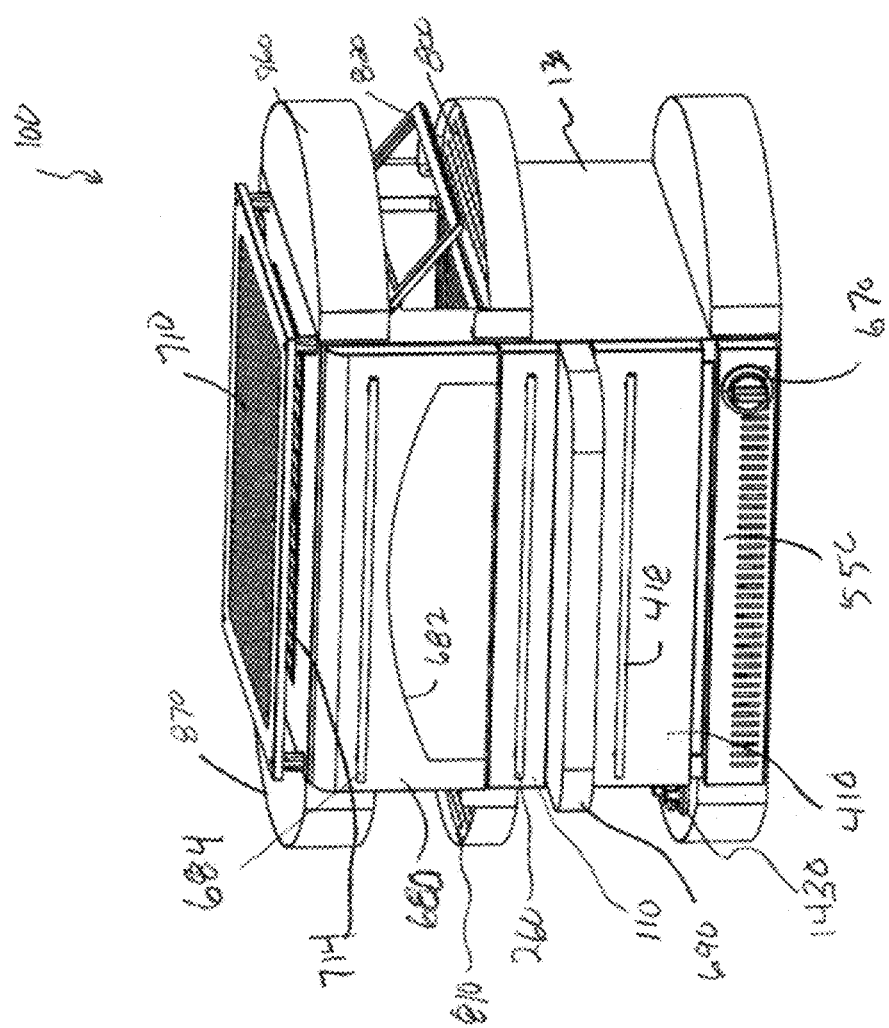
FIG. 2 is a front perspective view of the cooking apparatus.
Figure 3:
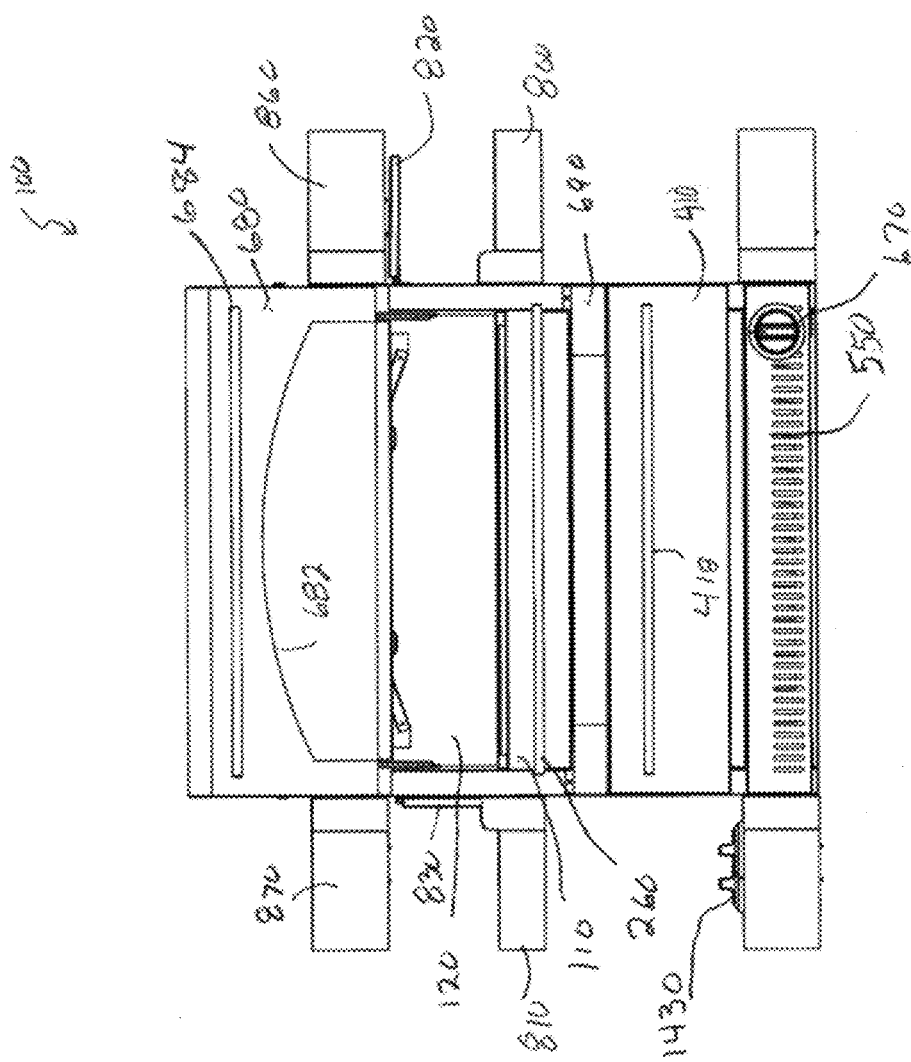
FIG. 3 is a front elevation view of the cooking apparatus.
Figure 4:
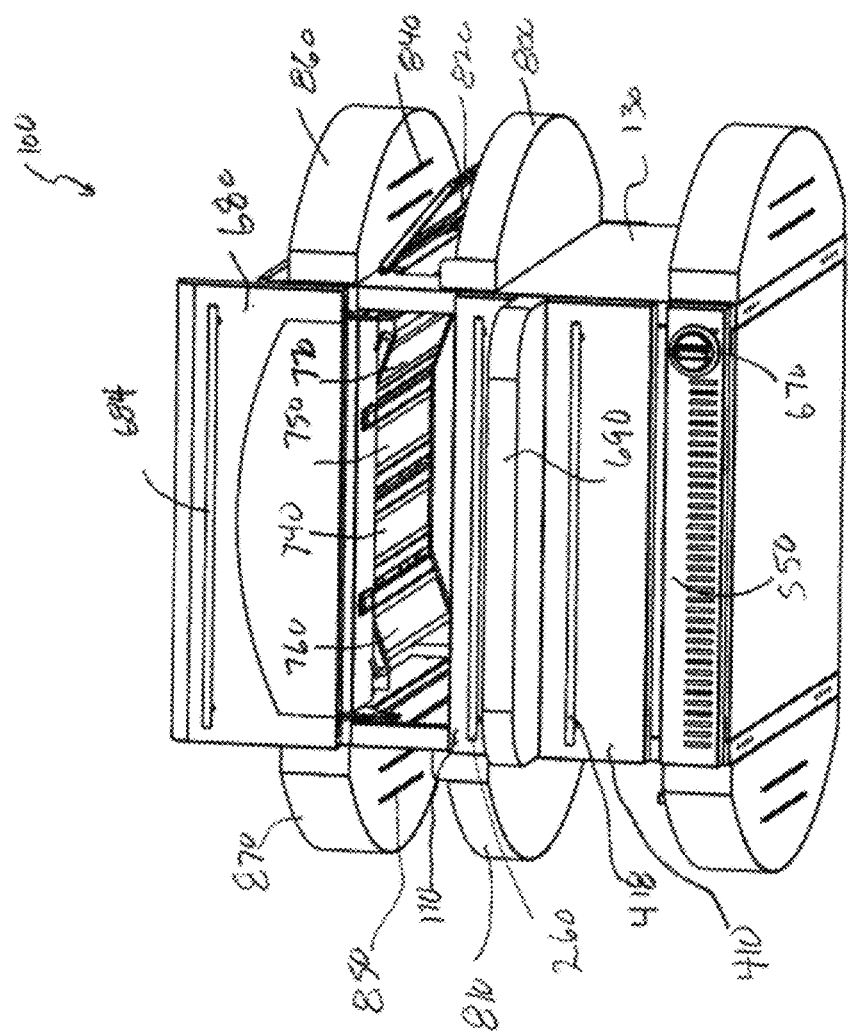
FIG. 4 is a bottom perspective view of the cooking apparatus with the front window in an open position.
Figure 5:
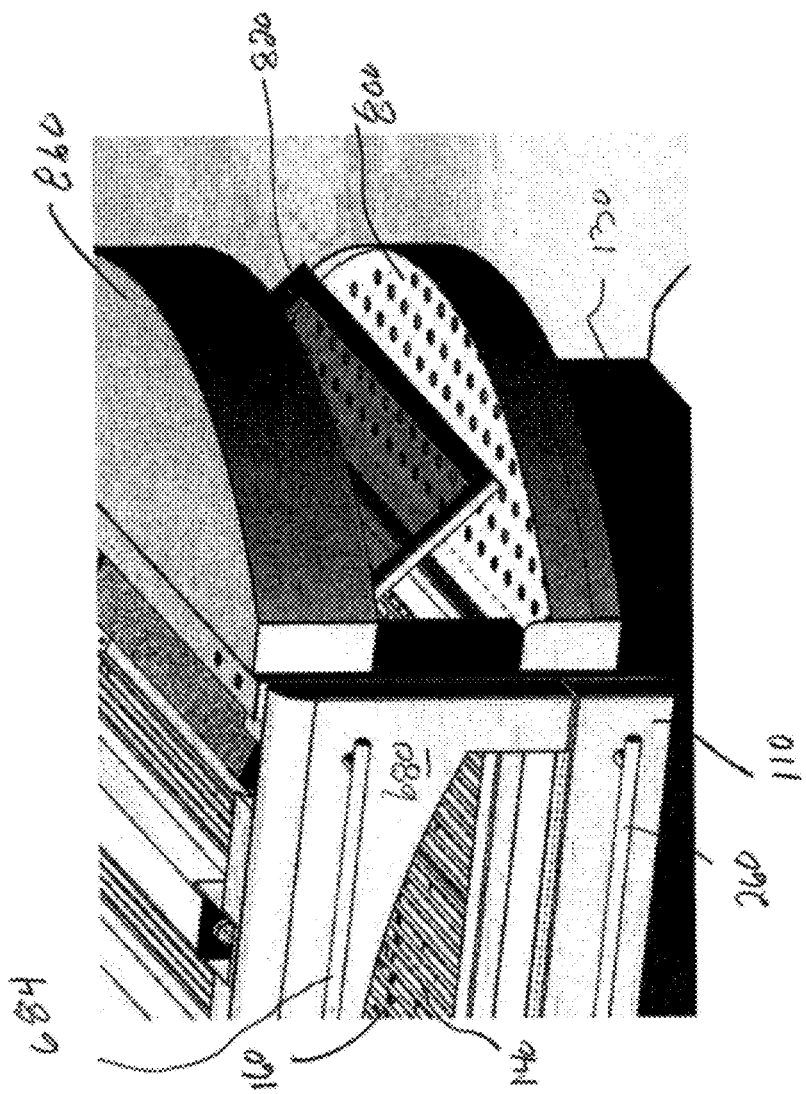
FIG. 5 is a top perspective view of the upper right corner of the cooking apparatus.

The cooking drawer 110 can have a food support insert shown generally at 140 supported therein for holding or supporting the food item 150 (FIG. 6) during a cooking operation in the cooking chamber 120. An example of an insert 140 is a conveyor belt 160 (e.g., FIGS. 5 and 6), which can be driven by a motor 170 to move laterally in the cooking chamber 120, in either direction or in one direction and then the other, one side/end to another. This will become more apparent from the discussion later relative to FIGS. 23A, B, C and D, which also show a pizza stone 200 for cooking a pizza 210.

The cassette 140 can be a conveyor belt 160, in which case the drawer 110 and conveyor belt together can define a conveyor belt drawer 220. Alternatively, the cassette 140 can be a conveyor belt and pizza stone 200. The cassette 140 can be motor driven when in operation or not motor driven. Examples of other inserts 140 are stationary pizza stone cassettes, motor driven cassettes for cooking chicken and kabobs etc., roller cassettes for hot dog cooking, walking beam conveyor cassettes for specialized cooking and other cassettes, as would be apparent to those skilled in the art, to deliver heating, cooking, smoking, searing modalities for processing food.

The construction of the cooking drawer 110 and the conveyor belt 160 can be understood from the drawing figures and particularly FIGS. 9, 10, 11 and 12.

Structural members 224, 230 and 240 form the perimeter of the frame of the cooking drawer 110. A front cover 250 and handle 260 are used to pull the drawer 110 open or push the drawer closed as desired. Channels 270, attached to structural members 230 and 240, guide the drawer frame over rollers positioned on the left and right sides of the cooking drawer 110 on the housing 130.

The belt cassette 160 can be constructed from frame elements 280, 290, 300, 310. Four belt gears 320 are fixed to rotating shafts 330 riding on two bearings which are fixed on front elements 280, 290, and two bearings which slide on frame elements 280 and 290. The belt 340, by virtue of the spacing of the teeth on belt gears 350, is forcibly driven forward by the gear teeth when the shafts 330 rotate. A spring-loaded yoke 360, connected to the left frame element, applies a balanced force to the sliding front and back bearings positioned on the left rotating shaft, and thereby to the belt 340, to create and maintain tension in the belt 340. This spring-loaded tension force is set and adjusted through access ports located in the left cassette frame and left belt drawer frame.

Positioning pan 370 facilitates easy insertion and removal of the belt cassette 160. The width of the pan locates the cassette 140, in a front to back direction, in the cooking chamber 120.

Finger guard 390 and cut-off blade 400 can be provided and attached to the belt cassette arrangement to protect the operator from accessing the moving belt and gear edges, and to cut free food items which have become stuck to the moving belt 160 because of the cooking function. These elements are contained within the structure of the belt cassette 160. As various other food processing cassettes may be used in the cooking apparatus, the value of attaching cassette-specific design elements to the cassette body can be appreciated.

A solid fuel support drawer of the cooking apparatus 100 is shown generally at 410 in FIGS. 1, 6, 14 and 16, for example. Solid fuel support drawer 410 can be positioned in an operative inserted position relative to the housing 130 and below the cooking drawer 110 and in an alternative removed position relative to the housing.

Figure 14:
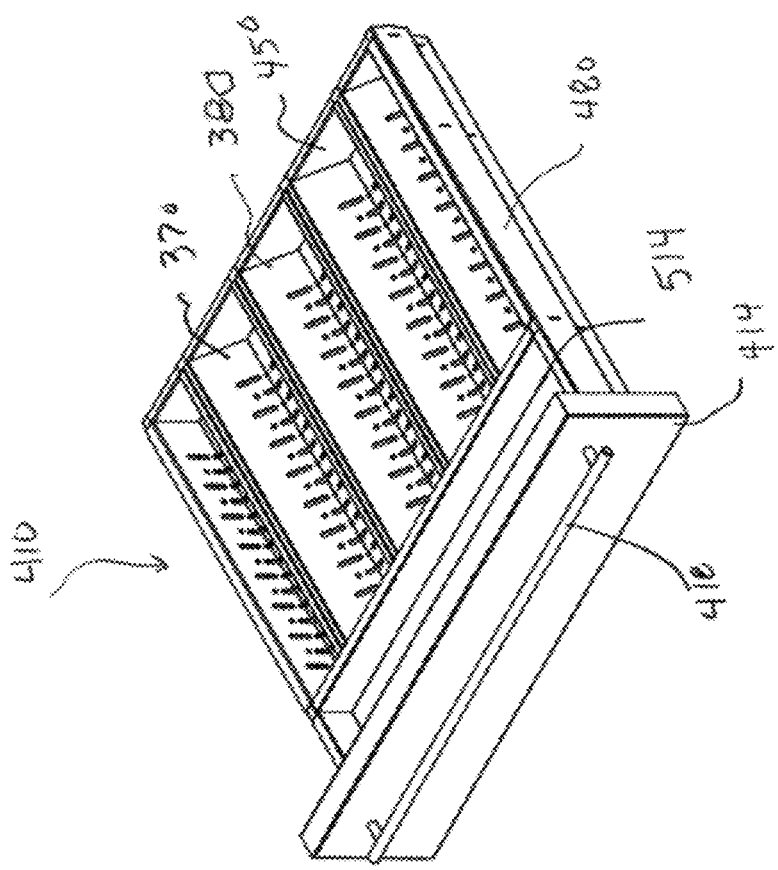
FIG. 14 is a front perspective view of the solid fuel drawer of the cooking apparatus illustrated in isolation.
Figure 15:
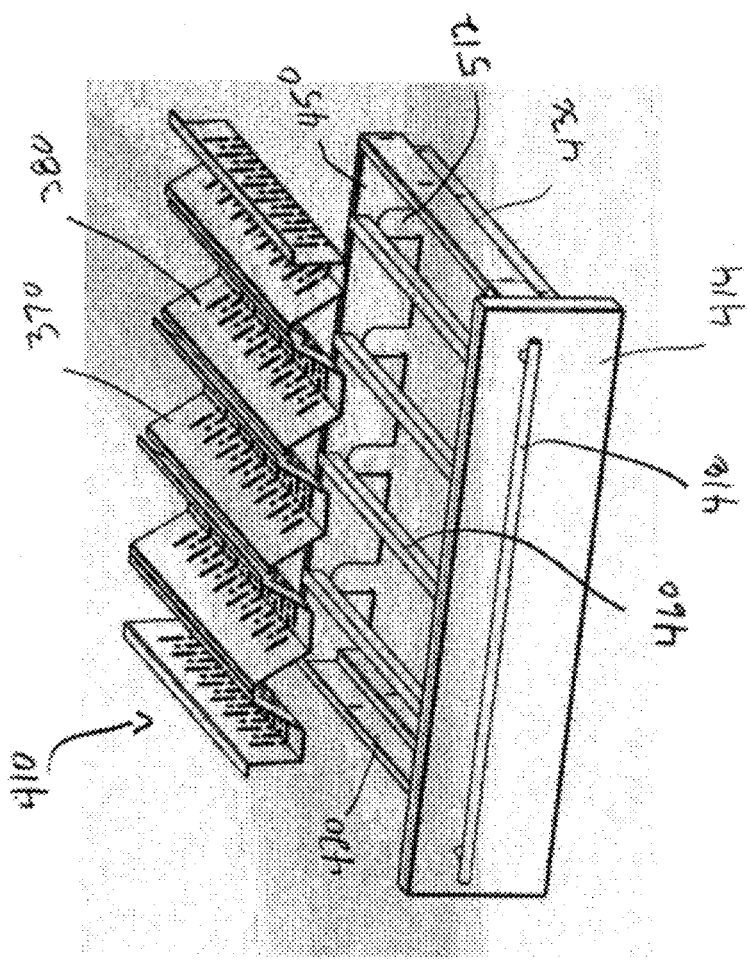
FIG. 15 is an exploded perspective view of the solid fuel drawer of the cooking apparatus.
Figure 15A:
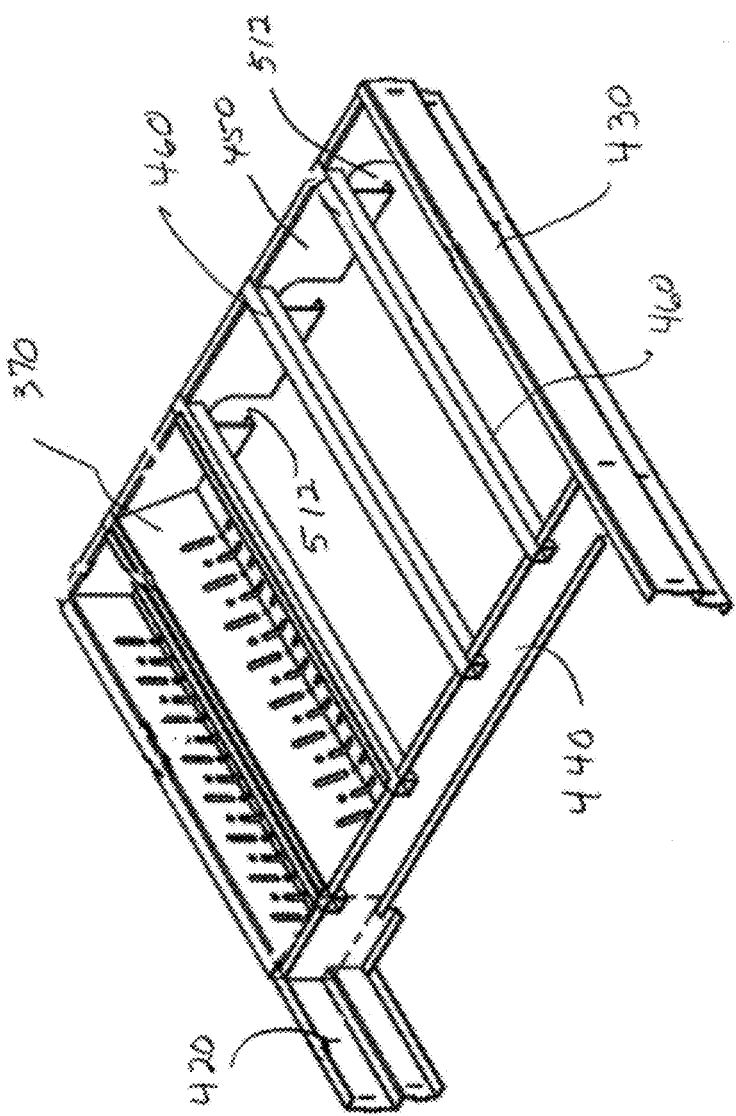
FIG. 15A is a front perspective view of the solid fuel drawer when partially-assembled.
Figure 16:
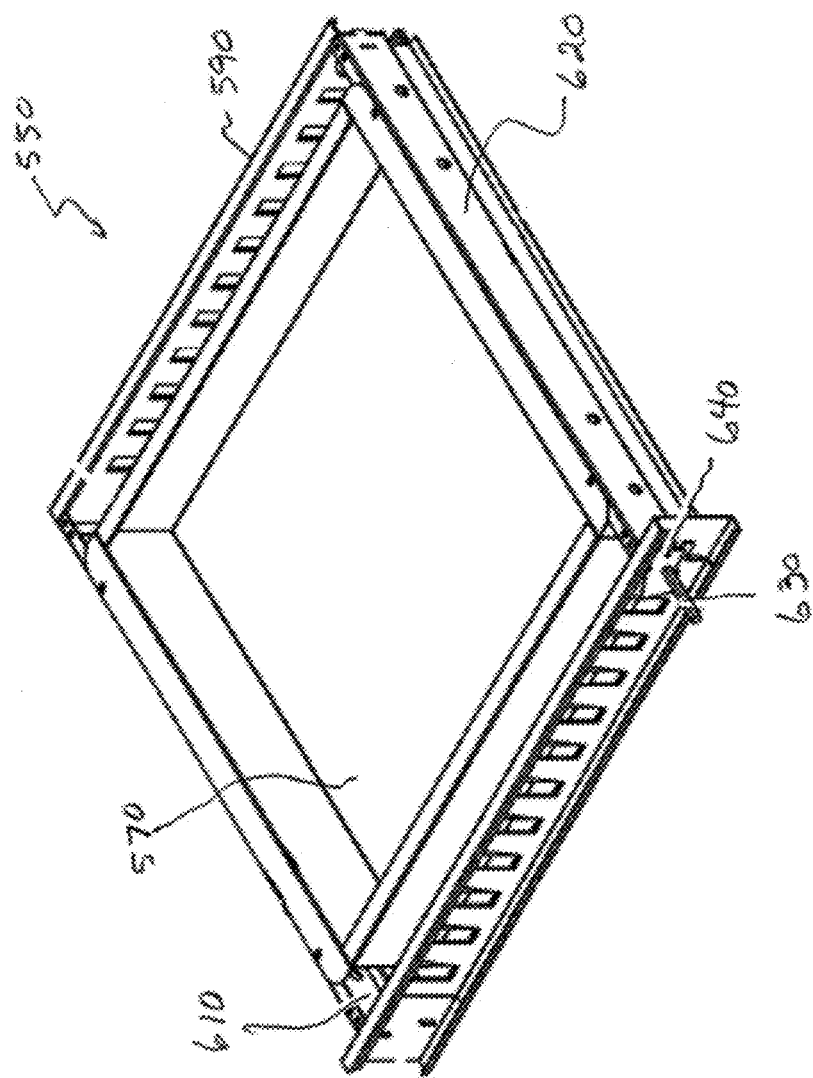
FIG. 16 is a front perspective view of the ash drawer of the cooking apparatus without the front panel.
Figure 16A:
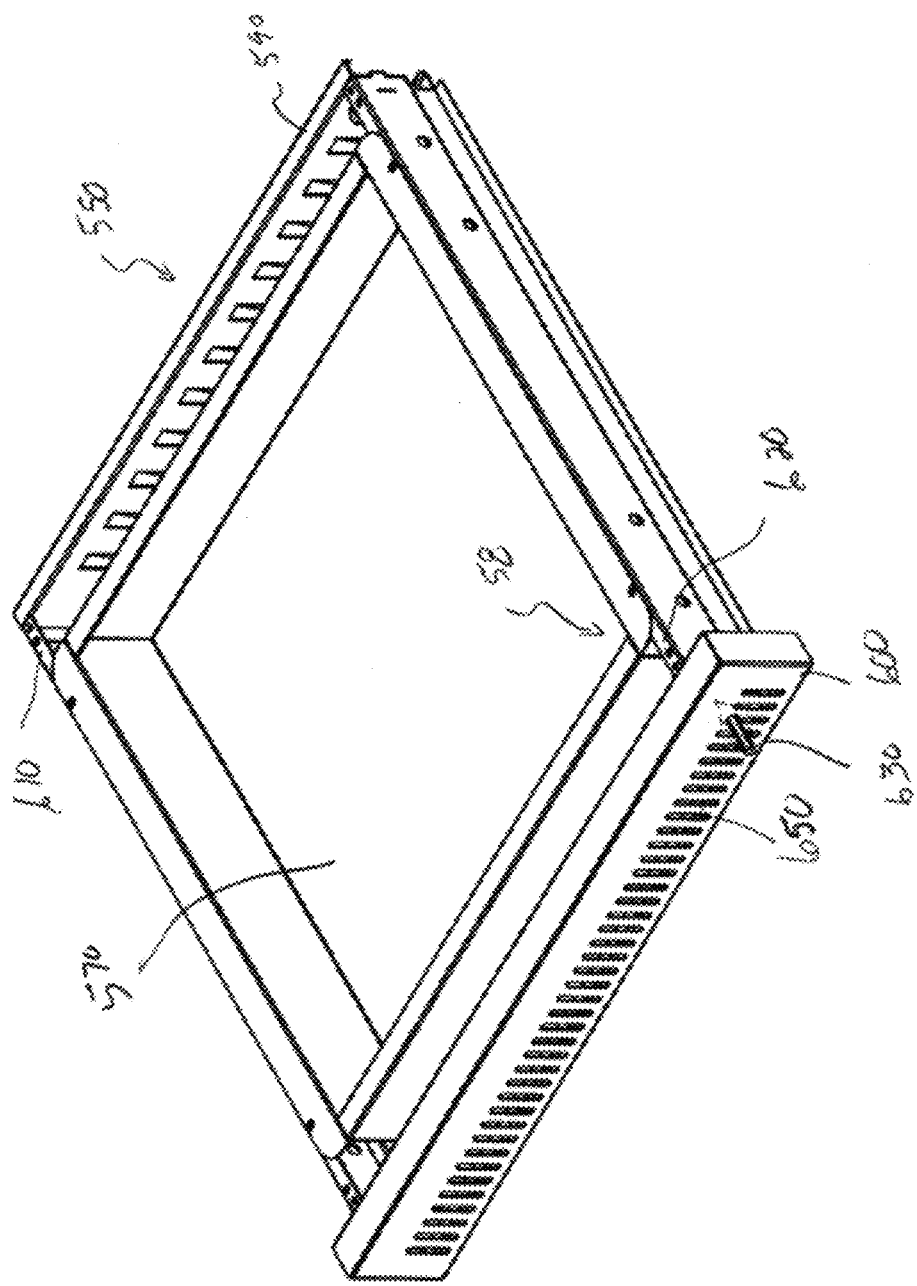
FIG. 16A is a view similar to FIG. 16 with the front panel but without the knob.
Figure 17:
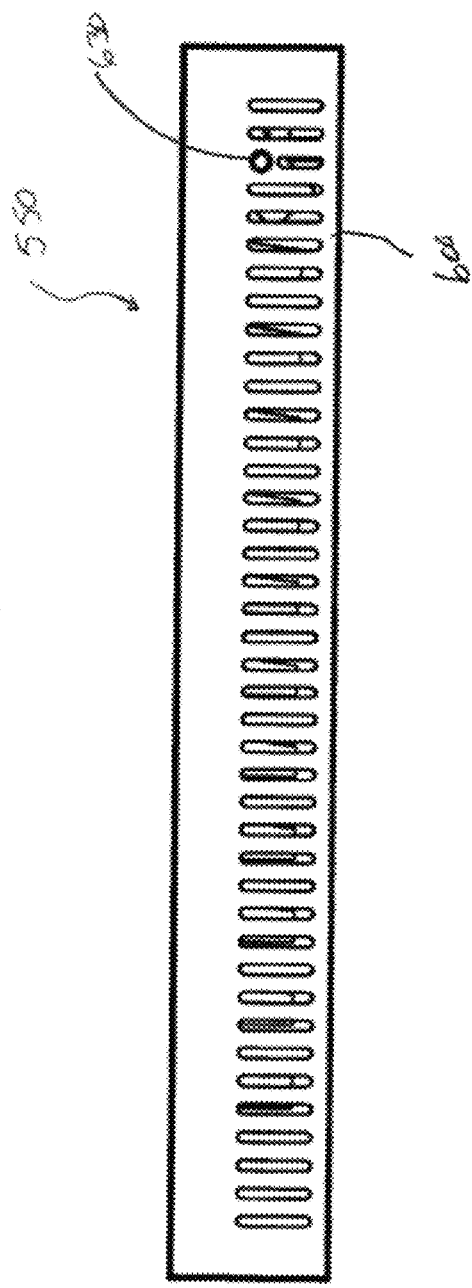
FIG. 17 is a front elevation view of the ash drawer of FIG. 16.

Referring to FIGS. 14, 15 and 15A, solid fuel support drawer 410 has a frame having a front plate 414, a handle 418, structural members 420, 430, and beams 440, 450. Cross bars 460 are positioned between beam 440 and beam 450 to position solid fuel supports 470, 480 over (four) straight line gas (natural gas or propane) burners 490 which pass through openings 500 at the back member of the drawer 410 (FIG. 15A). In operation, the geometric design (e.g., a U, V or W type shape with through-slots 512) of the solid fuel supports 470, 480 shields the straight burners 490 from falling debris and also allows burner flames to operate both as a combined ignition source for solid fuel 510 (FIG. 6) placed on the solid fuel supports 470, 480, and as an infrared radiation source. Solid fuel supports 470, 480 are designed to be easily removed for cleaning and then reinstalled in the solid fuel support drawer 410.

Solid fuel support drawer 410 can include a spacing tray 514 configured to hold liquid flavorings which are proximate to the burners 490 such that the flavorings will become heated and support evaporation of the flavorings to the food item.

Figure 6:
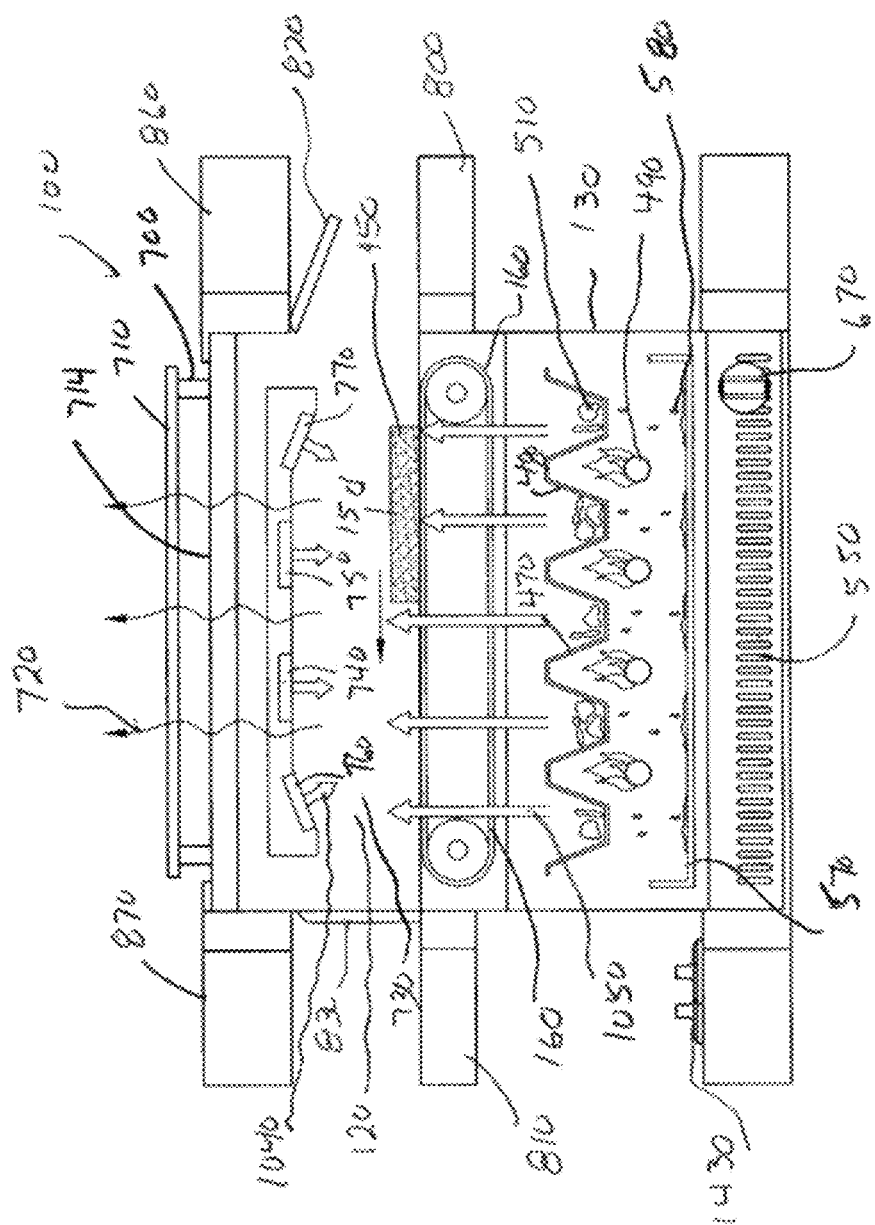
FIG. 6 is a simplified cross-sectional, elevation view of the cooking apparatus illustrating its functions and operations.
Figure 7:
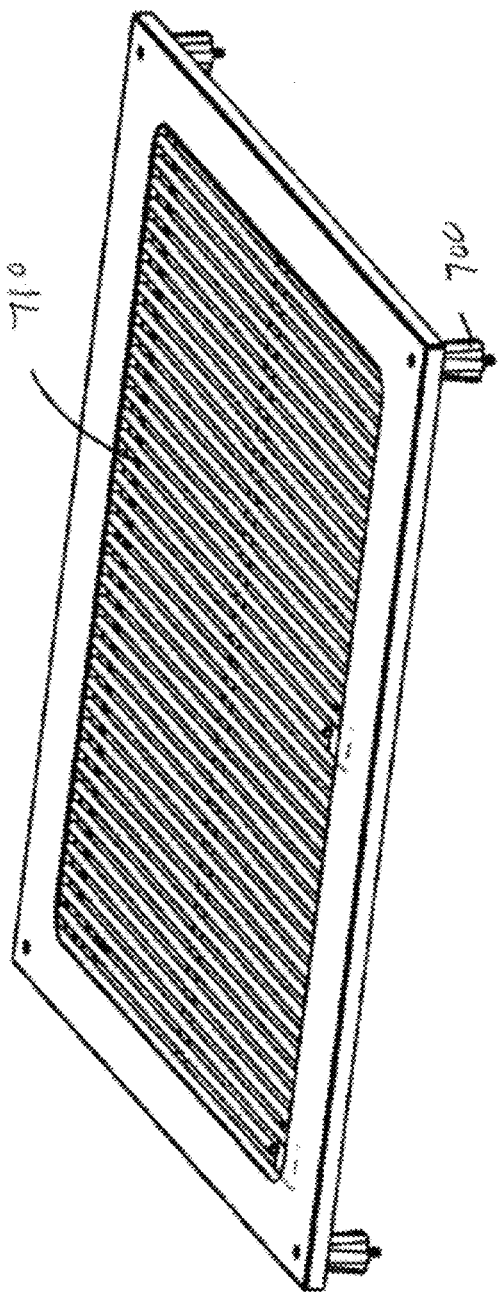
FIG. 7 is an enlarged perspective view showing the top warming/cooking grill of the cooking apparatus in isolation.
Figure 8:
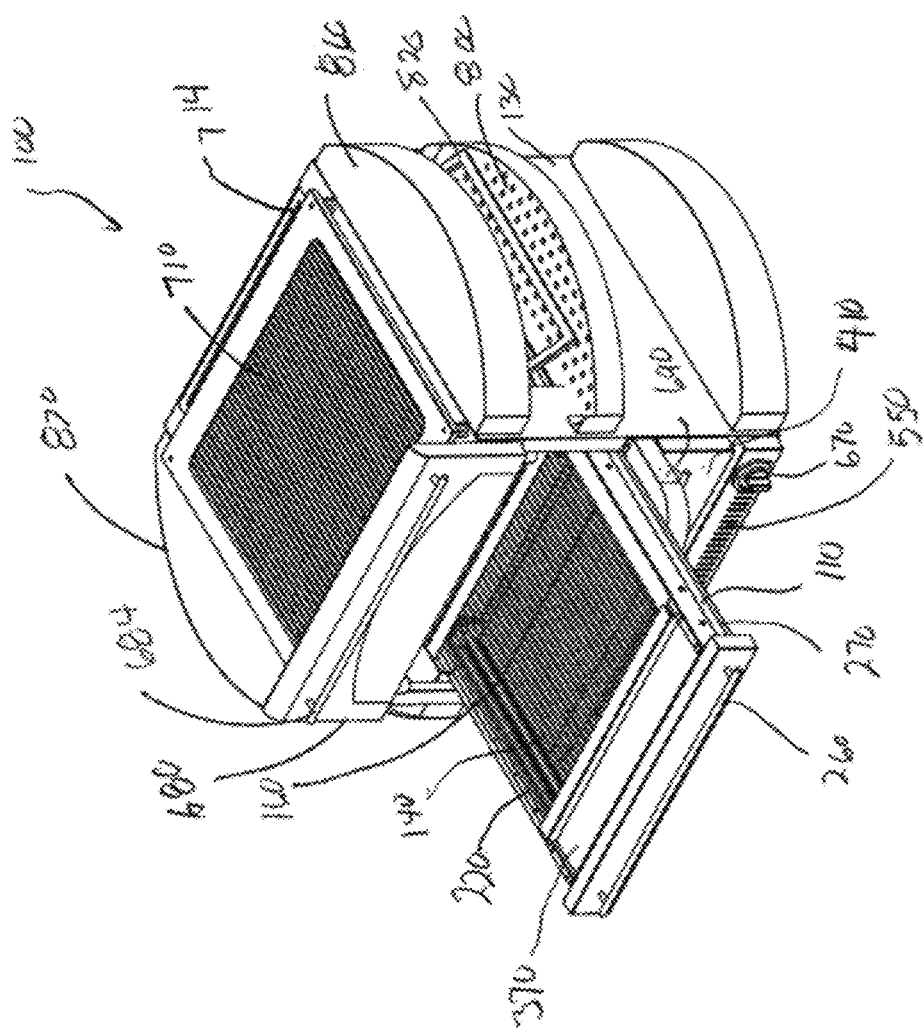
FIG. 8 is a perspective view of the cooking apparatus showing the parallel lift door in a raised position and the conveyor belt (cooking) drawer pulled out.
Figure 9:
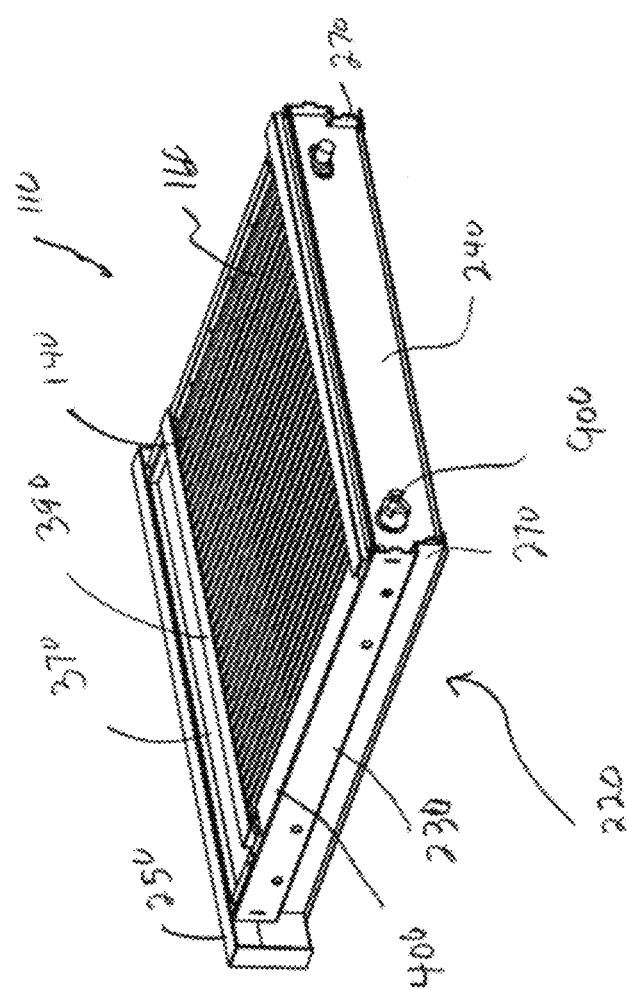
FIG. 9 is a rear perspective view of the conveyor belt drawer in isolation.
Figure 10:
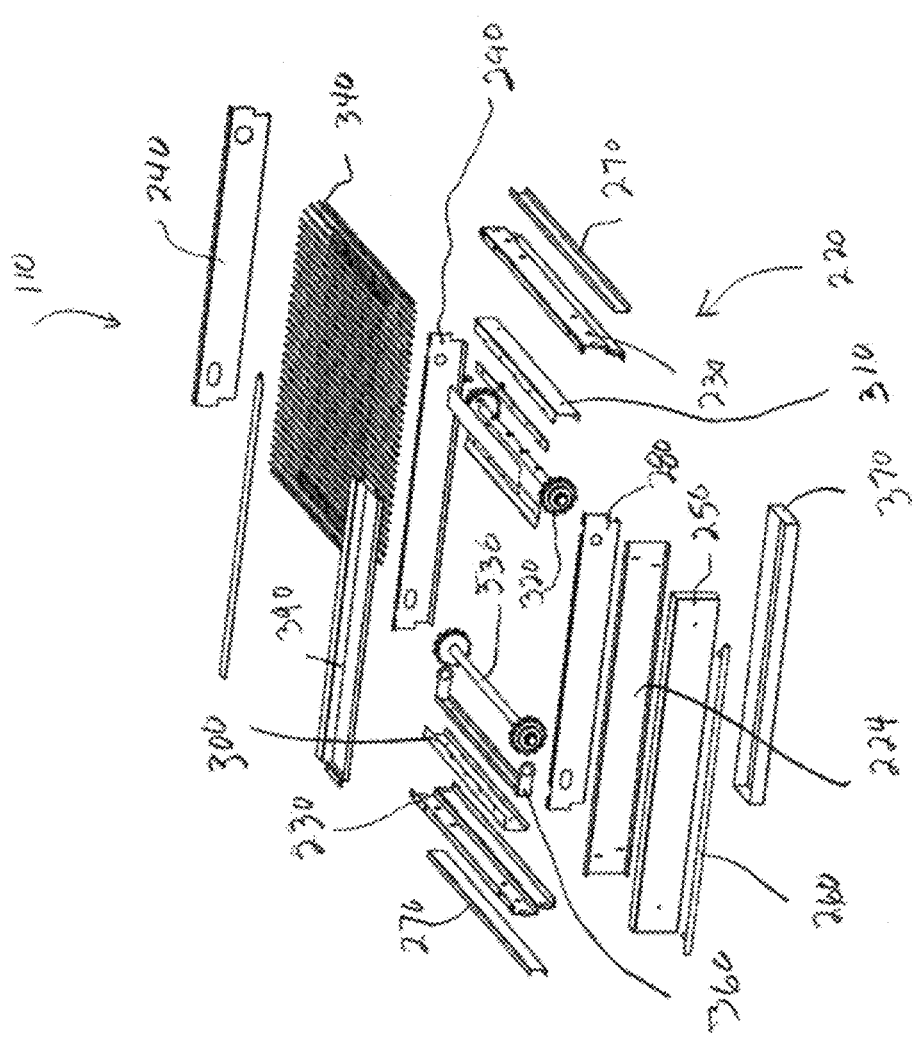
FIG. 10 is an exploded perspective view of the conveyor belt drawer.
Figure 11:
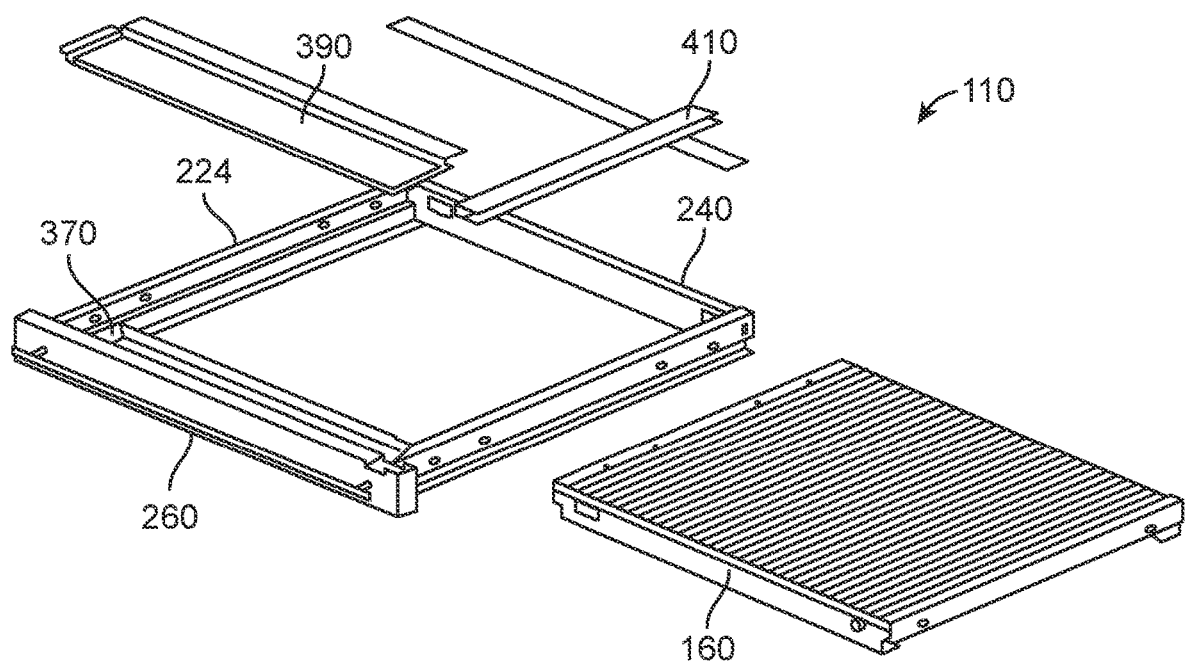
FIG. 11 is an exploded perspective view of the conveyor belt drawer showing the conveyor belt separated from the drawer frame.
Figure 12:
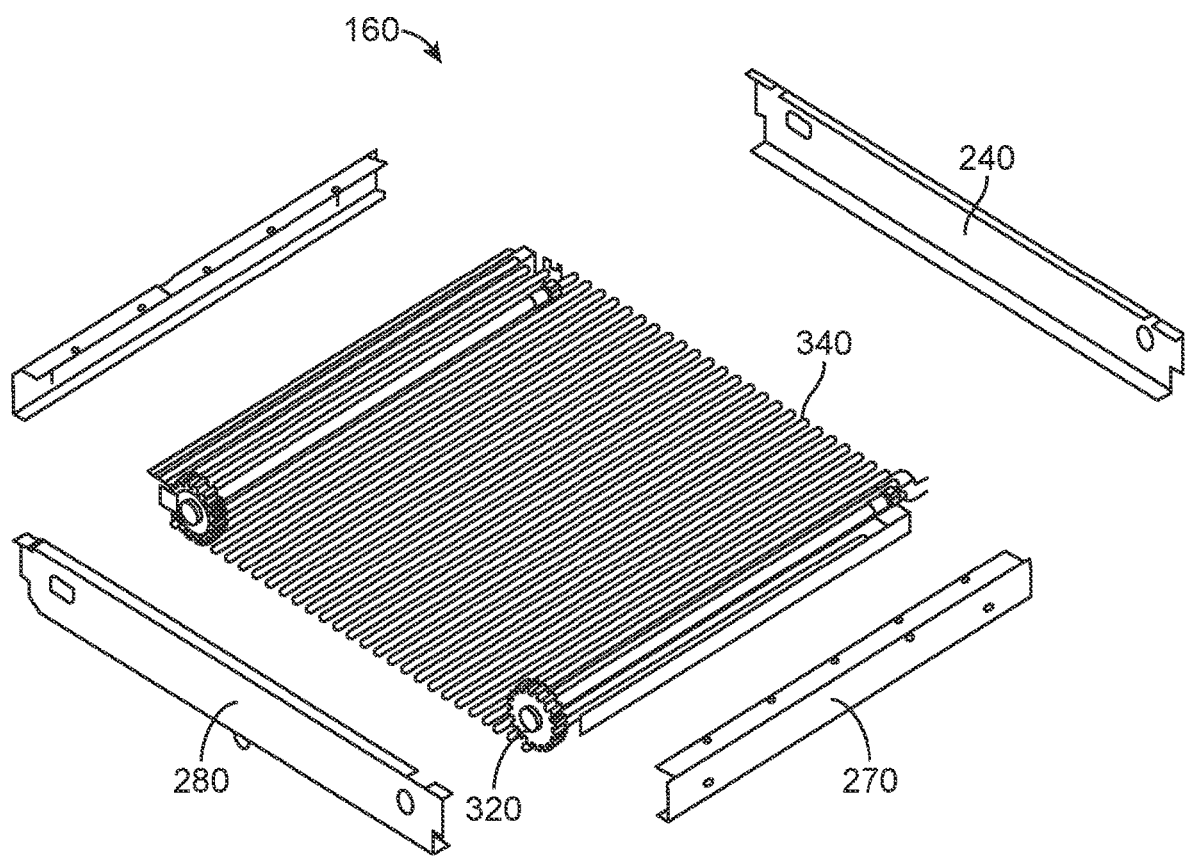
FIG. 12 is an exploded perspective view of the conveyor belt of FIG. 11.
Figure 18:
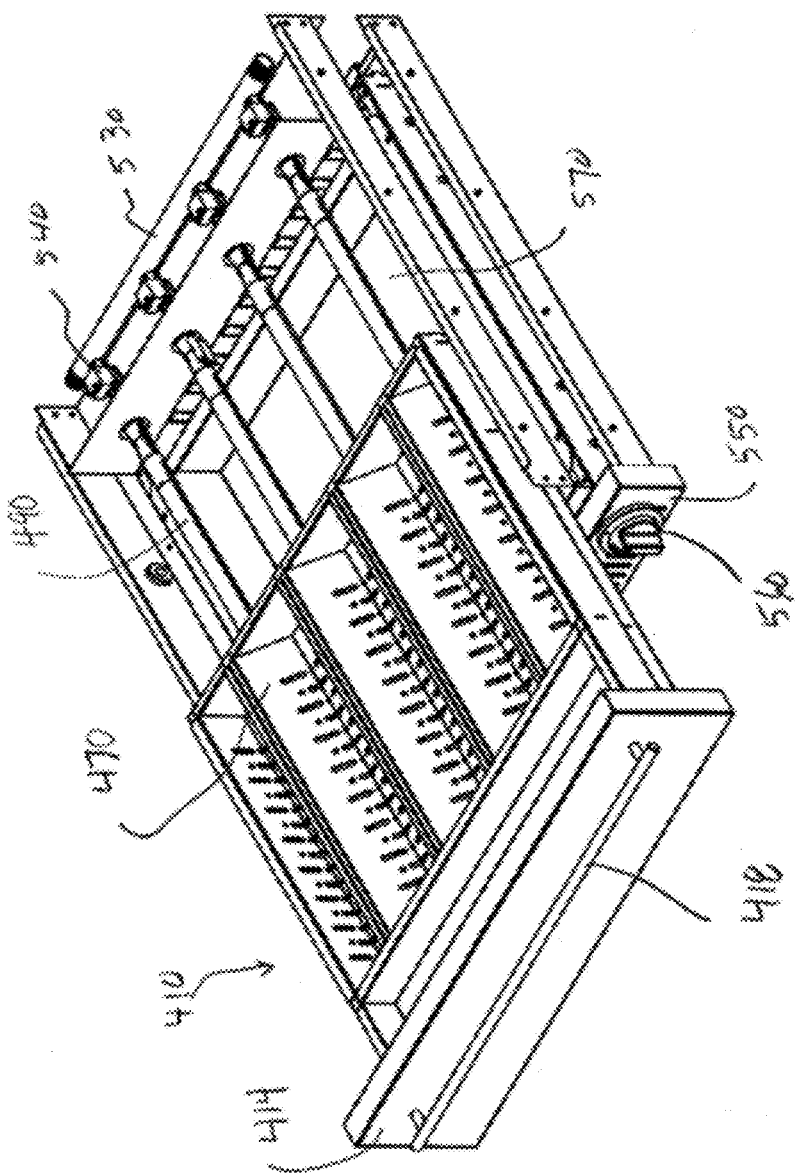
FIG. 18 is a perspective view of the solid fuel drawer, the ash drawer and the gas burner assembly of the cooking apparatus and in operational relation.
Figure 24:
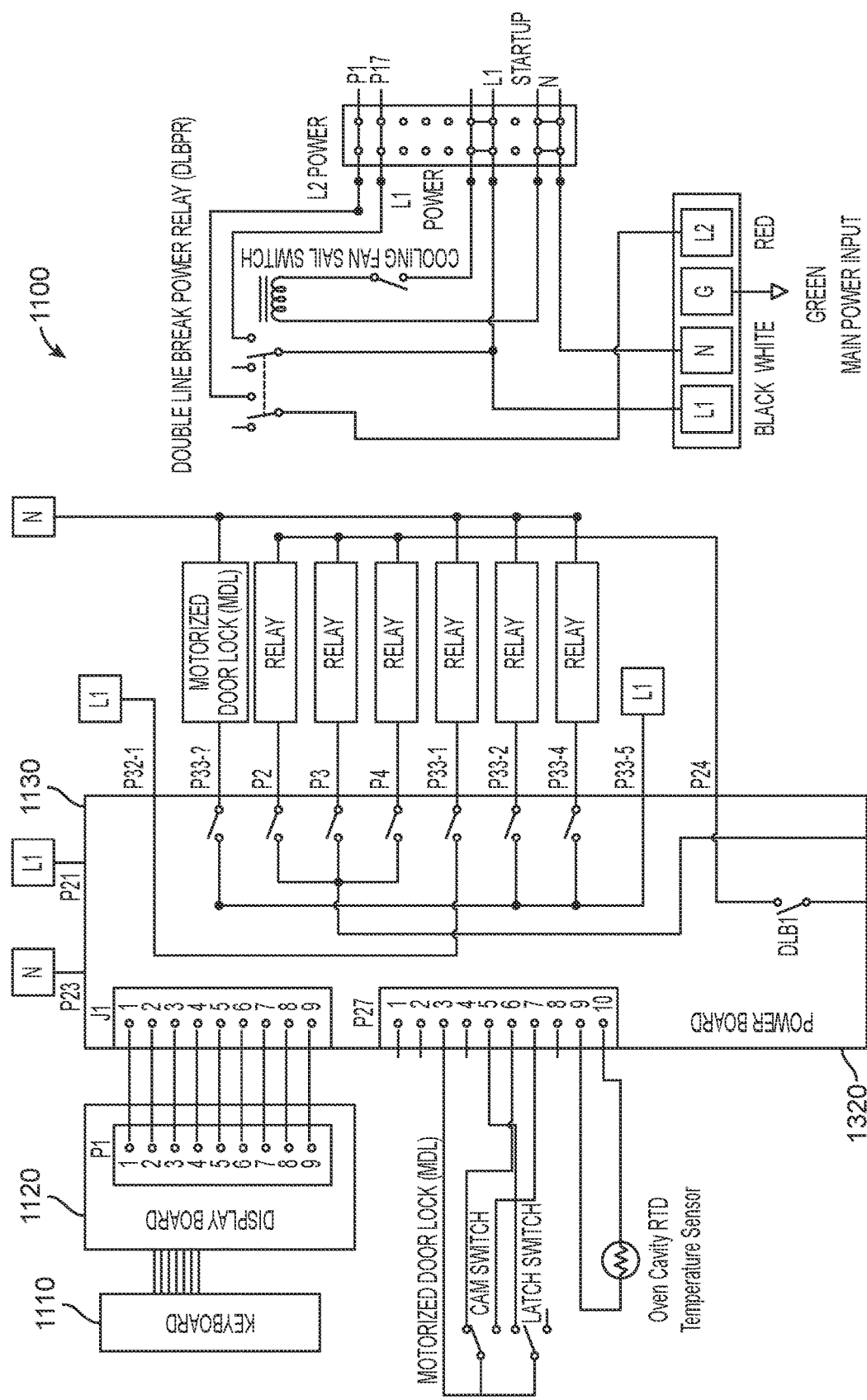
FIG. 24 is a wiring diagram of the cooking apparatus.
Figure 26:
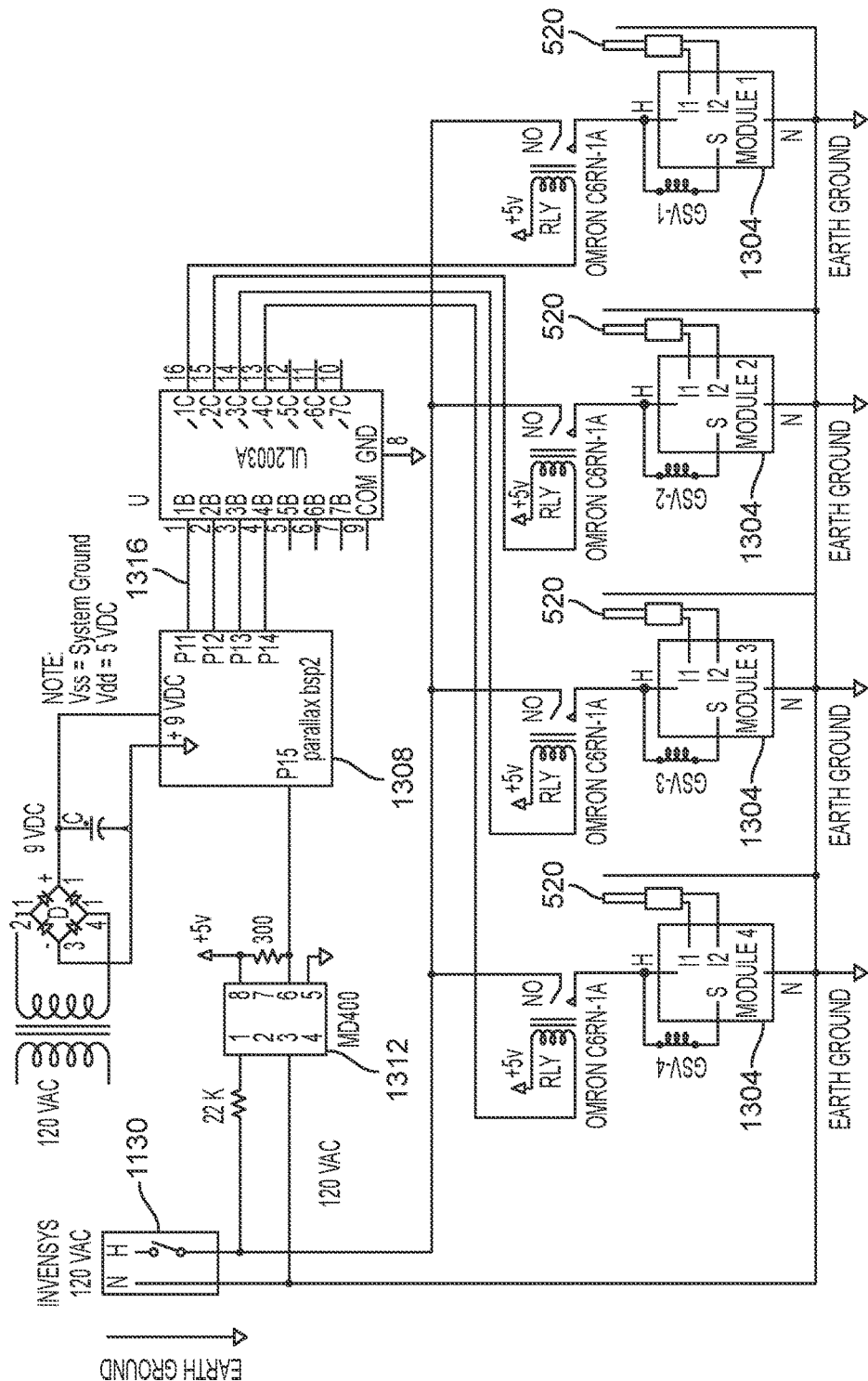
FIG. 26 is a diagram of the ignition sequencer of the cooking apparatus.

The solid fuel supports 470, 480 position solid fuel 510 close to the flames from the straight-line burners 490 (FIGS. 6 and 18). The burner sub-system holds (four) straight-line burners 490 and hot surface or direct spark ignition sources. Under control of the ignition computer (see FIG. 26), hot surface igniter 520 is heated to a temperature sufficient to ignite the liquid propane or natural gas fuel present in a pressurized manifold 530 (FIG. 18). When the ignition computer determines that igniter 520 is at ignition temperature, the respective solenoid valve 540 is opened. Any one or more of the burners 490 can be ignited at any time as specified by the main control and ignition control computers (FIGS. 24 and 26). With suitable ignition source temperature, and an open solenoid valve 540, gas flows through straight-line burner 490 and ignition occurs.

Positioned below the solid fuel support drawer 410 is an ash drawer assembly 550. The ash drawer assembly 550 with rotating damper shutter 560 is used to control the flow of ambient air to the solid fuel support drawer 410, thereby affecting the combustion rate of solid fuels 510 located on supports 470, 480.

The ash drawer assembly 550 can include: a frame positioned on rollers fixed to the main body of the housing 130; and a removable tray 570 for collection of ash 580 (FIG. 6). The frame has a front 590, a back 600, and sides 610, 620. The rotating damper shutter 560, which includes a shaft 630 connected to a cam 640 extends from the front to the back of the ash drawer 550, is used to increase or decrease air flow through the shutter elements 650 located at both the front and the back of the assembly. An adjustment knob 670 is attached to an end of shaft 636.

More particularly, when the shaft 630 is rotated counter-clockwise, cam 640, which is attached to the shaft, is also rotated. Pin 650 attached to cam 640 moves on a circular arc with the body of the pin retained in a circular slot located on moving shutter 660. Stationary front frame element 590, which holds moving shutter 660, allows the moving shutter to slide to the left, thereby increasing the area through which oxygen can flow to the solid fuel drawer 410. It can also be understood that a clockwise rotation of shaft 630 causes a similar motion of shutter 660 to the right, thereby decreasing the area through which oxygen can flow to the solid fuel drawer 410. Shaft 630 extends to the back of the ash drawer 550, and contains similar cam, pin, and slot elements to allow a parallel movement of a back shutter when a corresponding movement of the front shutter is desired.

Returning now to the cooking chamber 120 at an upper location of the cooking apparatus 100, a parallel-lift door 680 covers the front of the chamber during a cooking operation. Door 680 can have a (transparent) pizza oven arch shape 682 and a handle 684. That is, parallel lift door 680 is normally closed (vertical) during operation, but may be opened (swung up by pulling on the handle 684) to allow the cooking drawer 110 to be pulled out and moved to another location, such as the kitchen. In other words, the cooking food product, supported on a low thermal mass wire transport belt, is now positioned in the cool, flameless kitchen space, a location which facilitates easy inspection and manipulation (e.g. flipping) of the partially-cooked food product, such as steaks, burgers, etc., or to add another item, such as adding delicate shrimp to a pizza.

The door 680 can have two spaced glass panes, which are open at the bottom allowing cooling air to flow up between them. When the cooking drawer 110 is pulled out, drips which may fall from the food being cooked and supported by the drawer fall onto the tray 690 projecting out from the housing 130, and advantageously not onto the floor. Instead of being a stationary tray, tray 690 can also be configured as a fold-down or swing-down tray, attached to the solid fuel support drawer 410, for example.

Periodic checking by the home cook is often needed to ensure that, for example, two-inch thick steaks or "onion and pepper burgers" travelling side-by-side on the transport belt 160 are not collectively overdone/burned or raw/undercooked. This can be easily done with the present cooking apparatus 100, as discussed above, by removing the drawer 110 with the food item 150 thereon to another location where the food item can be inspected in good light and without the heat and smoke of a traditional barbecue.

Cooking/rethermalizing food using combustion and cooking products issuing from the cooking chamber 120 can be done by the cooking apparatus 100. Grate frame 700 holds removable grate 710 over the high temperature exhaust area 714 (FIGS. 2 and 6) of the cooking apparatus. When the cooking chamber 120 is held at, for example, 350° F., the temperature rise from heat available 720 in the area 714 of the grate frame 700 will be limited by and to that temperature. When a broil action is called for by the operator, the temperatures at the grate frame 700 area will be significantly higher, resulting in substantial ability to cook hot dogs, saute a pan of onions, sear a skewer of shrimp and vegetables, etc. on grate 710.

In other words, grate 710 located at the top of the housing 130 allows food to be grilled using the bake and broil burner exhaust. Burgers, shrimp kabobs, fried onions or baked beans can be rethermalized or cooked as desired on the top grate 710 within easy view of the operator and without needing to add these items to the mix of food items being already cooked inside the cooking chamber 120 on the transport belt 160 and without impacting the uniform temperature of the cooking chamber 120 required if an artisan pizza or bread, for example, were present in the cooking chamber 120.

FIG. 6, for example, shows the arrangement of broiler deck ceramic tile infrared burners 730 positioned at the top of the cooking chamber 120 and over the cassette drawer 110. The geometric arrangement of the burners 730 is such that infrared energy emanating from the two center burners 740, 750 is directed mainly downwardly, and infrared energy emanating from the two edge burners 760, 770 is directed mainly away from the input and output side tray areas (discussed below) and more so, toward the center of the cooking chamber 120.

During typical operation, high temperature air from solid fuel drawer 410 area flows upward to the cooking chamber 120 containing the belt cassette 140 for desired cooking actions. Remaining air flows upward and out through the grate 710. During broil operations, infrared energy from the infrared burners 730 is directed down to the belt cassette area, and very high temperature air resulting from the ceramic tile broil burner 730 flows upward through grate 710. This high temperature air is well suited for food finishing operations of food on the grate 710.

Input and output shelves 800, 810 extending out from the housing 130 on opposite sides of the cooking chamber 120 can hold food items waiting to be positioned on the cooking cassette operating in the cassette or cooking drawer 110, or those which have already been processed. Drop-down side doors 820, 830 create a cooking chamber having good temperature control for the baking of pies or breads or pizza, for example. Illumination of the input and output shelves

800, 810 can be by lighting elements (LED or halogen lighting or various incandescent lights) 840, 850, which shine down from enclosures 860, 870. Electronic control and ignition elements can also be located in the outwardly-projecting enclosures 860, 870.

Heat lamps may be located in these enclosures 860, 870, for example, to help maintain the surface temperatures of food products which have automatically issued from the cassette drawer.

Drop-down side doors 820, 830 may be opaque (solid and not transparent). Under normal, automatic operation, the doors are held open by suitable latching arrangements attached to enclosures 860, 870. As required by an operator selection of cooking modality (bake, broil, roast, smoke, etc.), both (or just one) of the drop-down side doors 820, 830 may be closed.

Alternatively, drop-down side doors 820, 830 may be transparent. Under normal, automatic operation with a belt cassette 140 in place in the drawer 110, the doors are held open by suitable latching arrangement attached to enclosures 860, 870. As required by an operator selection of cooking modality (bake, broil, roast, smoke, etc.), the drop-down side doors 820, 830 may be closed.

The present cooking apparatus 100 thus allows the operator to pull the belt drawer 220 out of the housing 130 for inspection and manipulation of single steaks or pizzas and also for several dozen "store-bought" hamburger patties to be loaded on the input side of the transport belt 160 for automatic, "no watch" cooking.

In other words, the drop-down input and output doors 820, 830, when closed, effectively seal the cooking chamber 120 thereby allowing for temperature control of the cooking chamber for baking pizza or breads, cakes, slow-cooking or smoking. For example, food product can be loaded at the input side through the open input door 820, transported to the middle of the cooking chamber 120 and held there with the doors 820, 830 closed until the proper time and temperature required for the cooking task (e.g. bake at 375° F. for thirty minutes) has passed. The output door 830 can then be opened, and the food transported on the conveyor belt 160 to the unloading area for removal. If the food needs to be handled, the front door 680 can be opened (as often is needed in residential kitchen cooking processes) and the food, positioned on the belt drawer 110, drawn into the kitchen. That is, artisan cooking of pizzas, flat and loaf breads and various other specialty items benefit from a sealed cooking chamber, such as can be created with the present cooking apparatus to deliver accurate control of both temperature and humidity.

Thus, the flip-down doors 820, 830 together help create a sealed cooking chamber 120 on demand when down and in the flip-up position, allow for more typical use as a conveyor/transport belt device delivering high cooking throughput. The belt transport drawer 110 allows the cook to be able to easily access artisan bread in the cooking chamber 120 from the front of the housing. On the other hand, with a functional belt 160, the cook does not need to open and close them at a rate determined by the transport belt speed and location of the food on the belt 160.

A further benefit of the input and output doors 820, 830 is that, when placed in the up position, the surface and extent of the doors shields the semi-circular chassis features (the enclosures 860, 870) of the cooking apparatus 100 from heat from the cooking chamber. These semi-circular chassis features 860, 870 can contain temperature sensitive computer and electronic control elements as well as the input/output tray illumination elements 840, 850. The doors 820, 830 when in the up position and if transparent, allow light from the lights 840, 850 in the enclosures 860, 870 to shine through the doors and thereby onto food on the input and output shelves 800, 810 as well as to partially light up the cooking chamber 120.

Yet another technology of the cooking apparatus 100 is the ability to selectively ignite portions, but not all, of the fuel source which allows for accurate temperature control of the cooking chamber 120. Four (for example) natural gas or propane gas burners 490 are positioned under the solid fuel supports 470, 480, which are configured so that flames from the burners 490 can issue up through the slots 540 in the supports and ignite split wood, coal, charcoal or other solid fuels 510 supported thereon. Each of the four burners 490 can be separately controlled thereby allowing for selectively igniting sections of the solid fuel 510. After a suitable ignition time period has passed or an actual temperature target has been reached, the ignition source 520 can be removed and the solid fuel 510 left responsible for creating an optimal cooking chamber temperature. If insufficient solid fuel 510 is burning to create that temperature, another burner 490 may be lit to ignite another section of the solid fuel 510. When viewing the burners 490 from the front of the housing 130 and referring to FIG. 6, the control algorithm might light the third burner 490 from the left, then the first one, then the fourth one and then the second one. This ignition sequence depends on the heat generated by the energy content of the solid fuel 510, how fast or slowly it burns, and the operator desired cooking chamber temperature.

When or if all of the solid fuel 510 has been burned, the one or more of the four gas ignition sources 490 can be used to maintain the operator requested temperature in the cooking chamber 120 for an indefinite period of time. This allows for the completion of cooking processes without having to compensate for temperature "droop" caused when the charcoal, wood or coal 510 is depleted.

Figure 13:
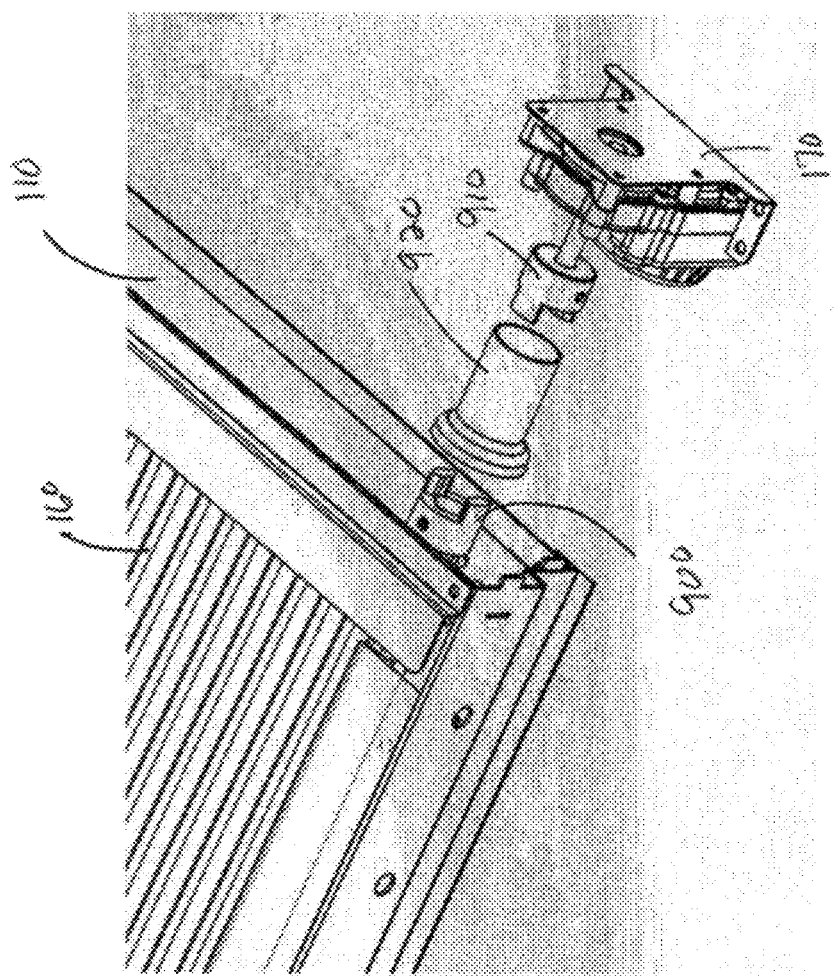
FIG. 13 is an exploded perspective view showing the releasable connection of the conveyor belt to the motor of the cooking apparatus.

Five components work together to drive the conveyor belt 160, namely a variable speed motor 170 and controller, a drawer coupling 900, a motor coupling 910, a coupling shroud 920 and a door sense switch. See, e.g. FIG. 13.

When the parallel lift door 680 is opened, the door sense switch sends a logic level signal to the motor controller which stops the variable speed motor 170 and reverses its direction for a short (e.g. one to five seconds) period of time. This reversing action separates the drive and driven faces of the drawer and motor couplings 900, 910. Without this action, the force of friction would be too high for the belt drawer 220 to be pulled out of the housing 130.

Once the couplings 900, 910 are disconnected, the drawer 220 can be pulled out and into the kitchen/patio area. After the chef completes inspection of the food on the belt 160, she can return the drawer to the inboard position in the housing 130. The coupling shroud 920 is tapered to accept the moving drawer coupling 900 and re-center it with the motor coupling 910. With the drawer fully in-board, the shroud 920 completely aligns the driving and driving parts of the coupling. Once the parallel lift door 680 is closed, the door sense switch sends a logic level signal to the motor speed controller 170 causing rotation to resume, the coupling faces to reconnect and the belt 160 to resume forward motion.

An external, chef-operated switch can also be used to signal stop/disconnect/reconnect/start. However, since the parallel lift door 680 is in the open position when the drawer 220 is being pulled out, to prevent the possibility of food being scraped off the belt 160 by the door, the automatic method may be a preferred embodiment.

The present cooking apparatus supports at least four separate operating modes discussed below.

In the first mode the solid fuel supports 470, 480 are removed from the housing to expose the four straight liquid propane or natural gas burners 490. With the supports 470, 480 removed, the combustion products of the straight burners 490, mixed with ambient air are the primary source of heat for cooking food in the cooking chamber 120.

The second mode uses the solid fuel supports 470, 480 to create a combination source of cooking energy. Hot combustion air and infrared radiation are created in this mode as high temperature air from the straight burners 490 flows through-slots 512 in the supports 470, 480, thereby heating the surfaces of the supports to an infrared emitting surface temperature greater than 180° F., for example.

The third operating mode occurs when solid fuel 510 is placed on the solid fuel supports 470, 480. The straight burners 490 ignite sufficient surfaces of the solid fuel 510 on the supports to create and hold an operator-specified temperature in the cooking chamber 120. When the heating value of the solid fuel 510 is exhausted, the straight burners 490 are recalled by the main control computer to provide sufficient heat to make up for the solid fuel heat loss, and so, serve to accurately maintain the temperature of the cooking chamber 120.

The fourth mode of cooking occurs when solid fuel 510 is placed in/on the solid fuel supports 470, 480 and the cooking chamber 120 is enclosed. During cooking, this solid fuel 510 will be ignited, but will not be exposed to sufficient oxygen to support high combustion rates, thereby creating a smoke. This smoke will issue through the cutouts 512 in the solid fuel supports 470, 480 and flow upward to the cooking chamber 120. This mode is particularly useful in certain cooking operations where it is desired to impart poultry, beef, fish or vegetables with mesquite, apple wood, hickory, cherry or other flavors.

Other cooking modes can use the infrared radiation from the burners 730 at the top of the cooking chamber 120 alone or with any of the cooking modes discussed above.

Additionally, the spacing tray of the fuel support drawer 410 can hold various liquid flavorings, which by proximity to the four straight line burners 490, will be heated and the heated liquid flavorings will evaporate and flow upward to the cooking chamber 120 where food is located, thereby imparting flavoring to the cooking food.

A flickering flame assembly 940 produces flickering flames that can advantageously be viewed from both the front and the back of the housing 130 through the front door 680 and through the back door 950. (The back door 950 can have a double pane construction similar to that of the front door 680.) This flame contributes to the traditional ambience created in wood-fired pizza ovens. Additionally, the burner 960 of the flickering flame assembly 940 and flames are isolated from the cooking area of the cooking chamber 120 so as to not affect the carefully controlled temperature of the cooking chamber. It can be isolated by transparent glass shields 964.

Figure 19:
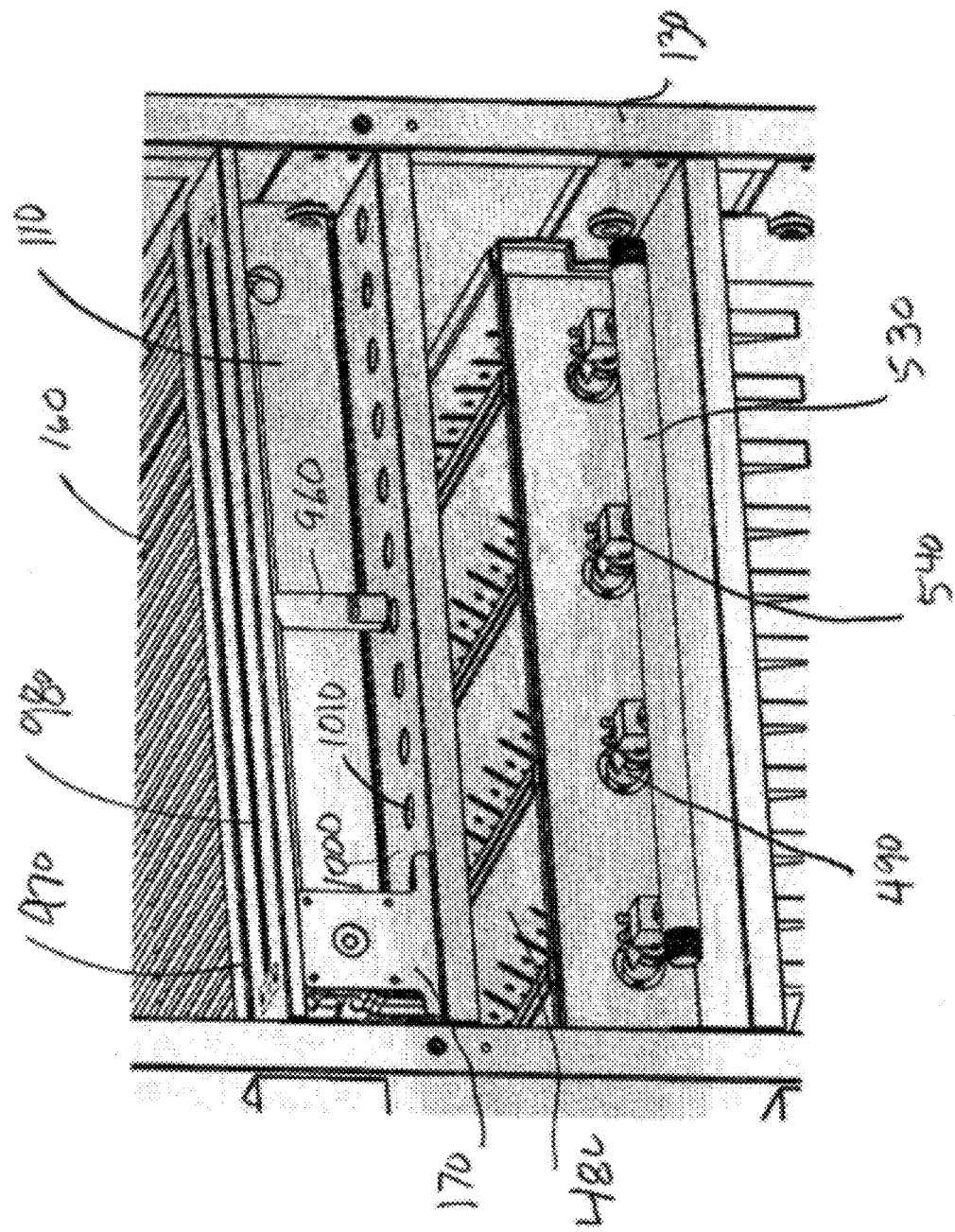
FIG. 19 is a rear perspective view of a portion of the cooking apparatus showing the gas burner assembly and the flickering flame assembly.
Figure 20:
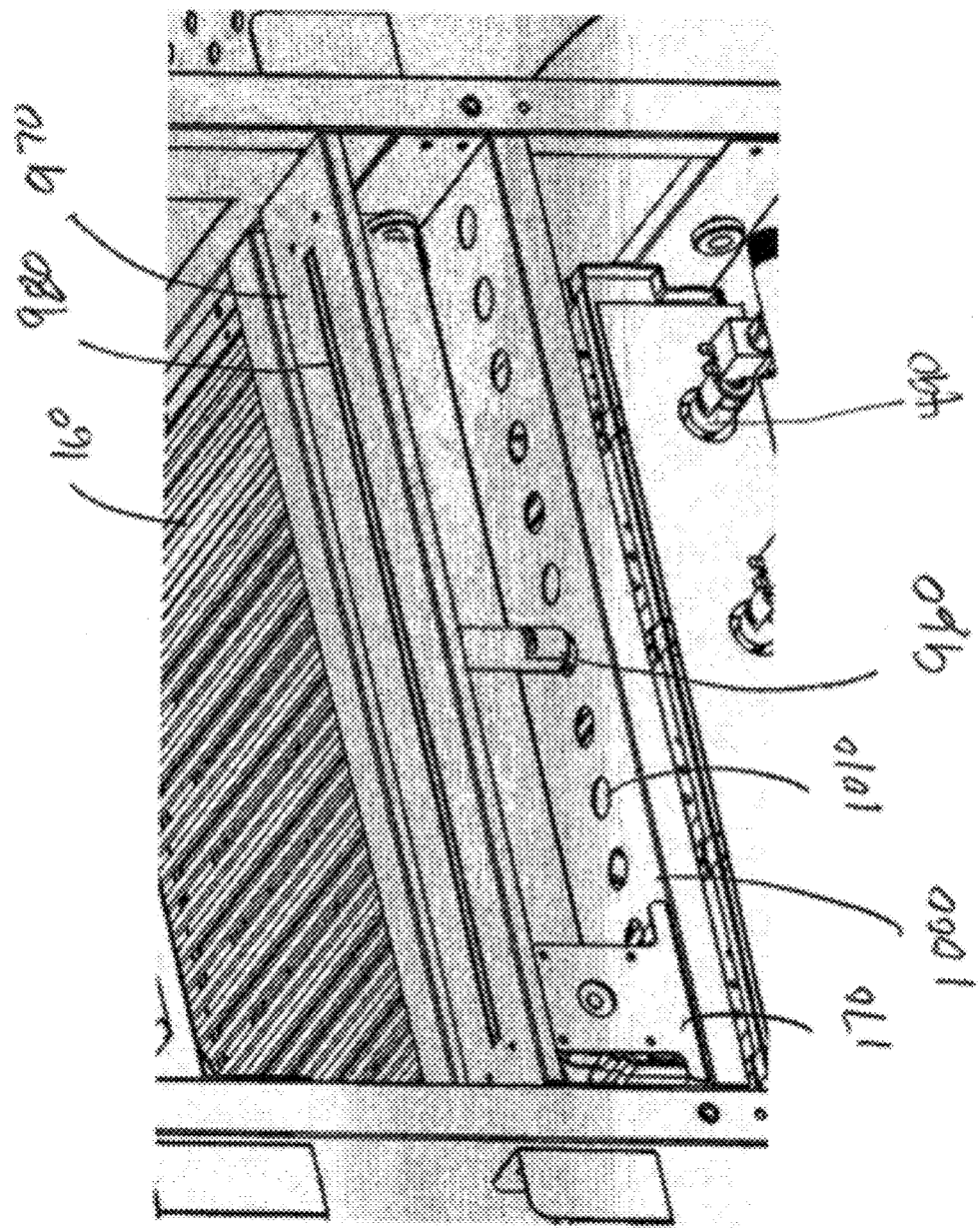
FIG. 20 is a view similar to FIG. 19, but from a different angle.

Shown in the back views of FIGS. 19 and 20 are the belt drive motor 170, the venturi of the burner 960 in a vertical orientation at the center, and gas solenoid valves 540, which simultaneously control gas flow to the bake burners 490 and the firing the fuel 510 on the solid fuel drawer 410. The flickering flame assembly 940, as mentioned above, takes special care to separate the fireplace flames from the primary cooking chamber 120 using an arrangement of glass shields 960 to insure that heat from the burner 960 does not influence the temperature of the cooking chamber 120. Furthermore, these additional glass panels 960 create an insulating air flow to significantly reduce the potential for burn hazard from the glass surfaces of the back door.

Figure 21:
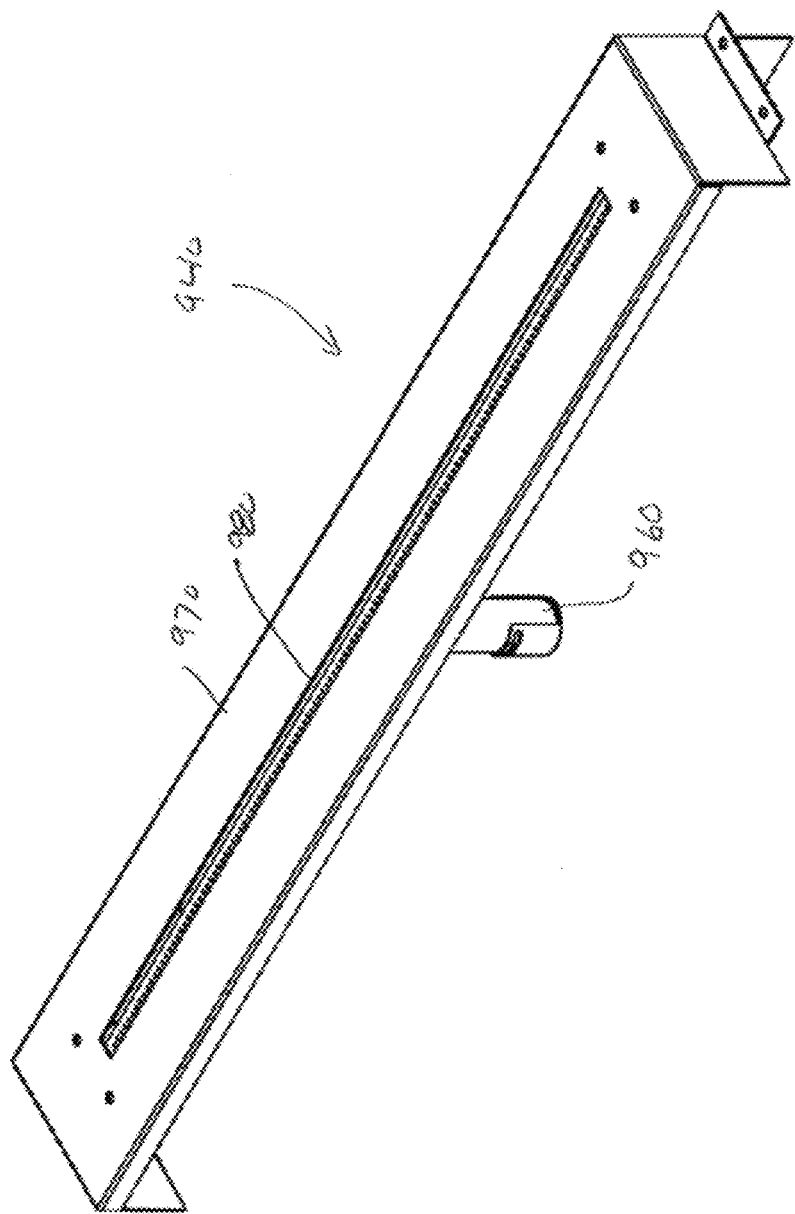
FIG. 21 is a perspective view of the flickering flame bar, as shown in FIG. 20, for example, enlarged and in isolation, of the flickering flame assembly of the cooking apparatus.
Figure 22:
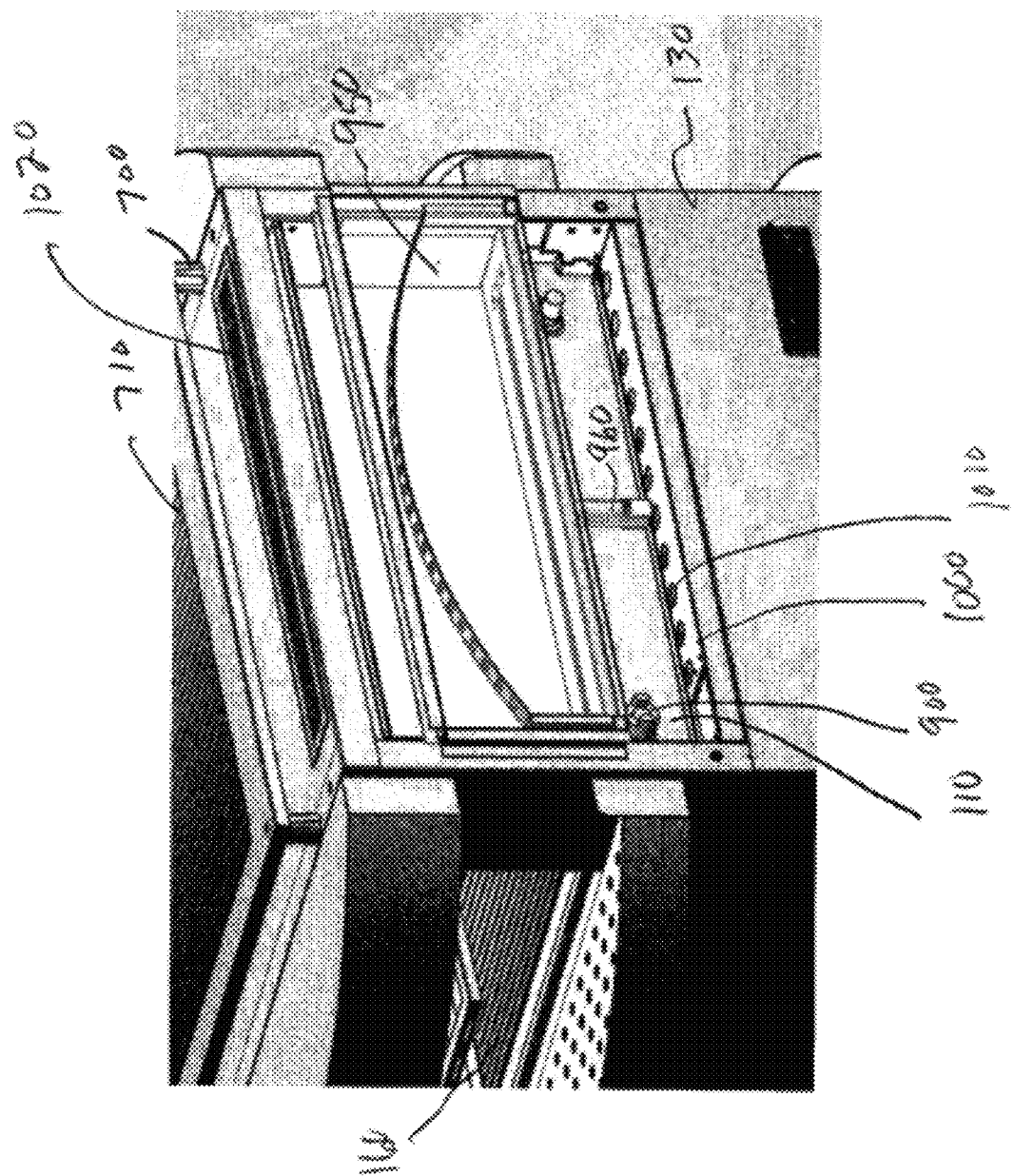
FIG. 22 is a rear perspective view of a portion of the cooking apparatus showing the rear window through which the flickering flames of the flickering flame assembly can be seen.

FIG. 21 is a perspective view of the flickering flame bar 970, as shown in FIG. 20, for example, and shows the slot 980 above the burner 960 through which the flickering flames from the flame burner pass. FIG. 22 shows the rear window (back door/window 950) through which the flickering flames of the flickering flame assembly 940 can be seen. Also shown is a shelf 1000 below the flame burner 960 and having a plurality of air flow-through holes 1010 and defining an air passageway with top vent 1020.

The cooking drawer 110, as mentioned earlier, is designed to receive many active cooking modalities embodied in drop-in cassettes. One such cassette is a powered or non-powered pizza stone 200, which can be placed in the location of the removed transport belt 160 (or any other modality) facilitating the creation of appropriate temperatures for the cooking of a pizza 1030—as well as allowing the cooking apparatus 100 to be used for a completely different purpose by simply removing the stone 200.

The temperature of the stone 200 can be controlled by the burners 490 using appropriate algorithms based on surface area, weight, specific heat of the materials and heating modality and using sensors which can measure and maintain the internal temperature and surface temperature of the stone using an RTD or thermistor probe or a non-contacting (infrared) temperature sensor. Furthermore, that probe can remain stationary in the stone and connect/disconnect to a suitable receptacle in the drawer arrangement similar to the disconnect/reconnect feature of the motor drive.

Figure 23A:
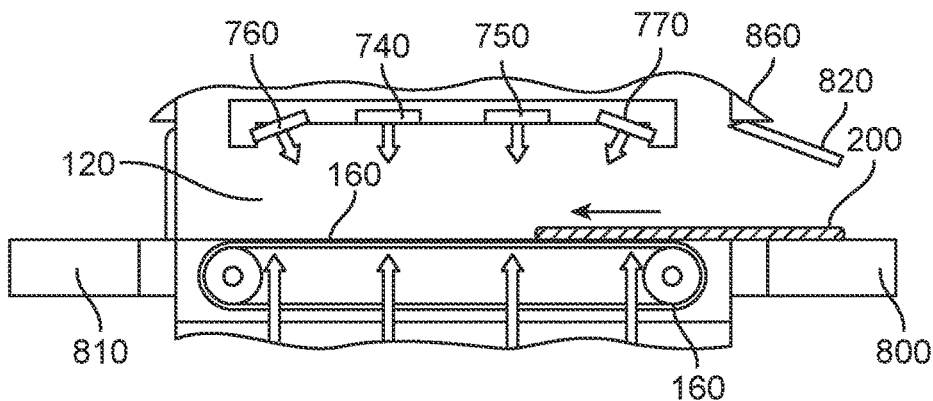
FIGS. 23A, B, C and D are schematic drawings showing sequential steps for cooking a pizza in the cooking apparatus.
Figure 23B:
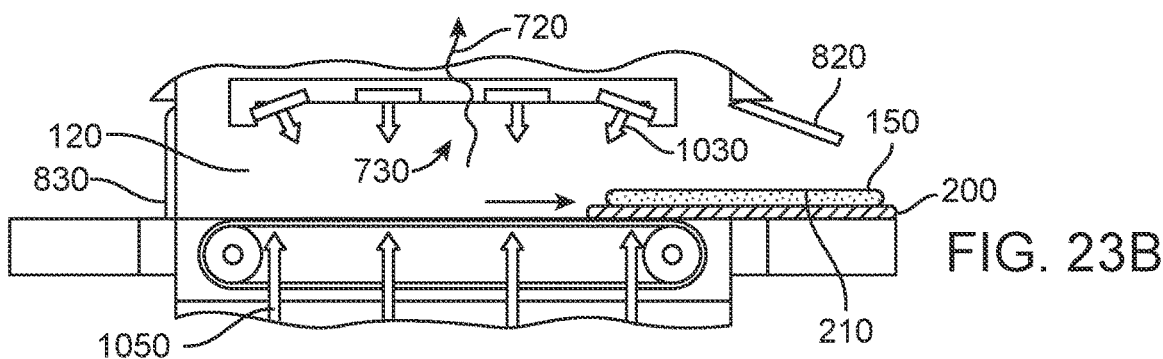
Figure 23C:
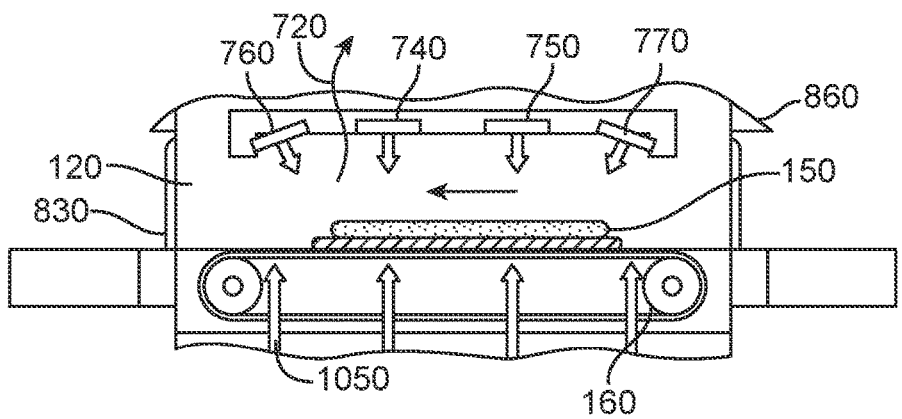
Figure 23D:
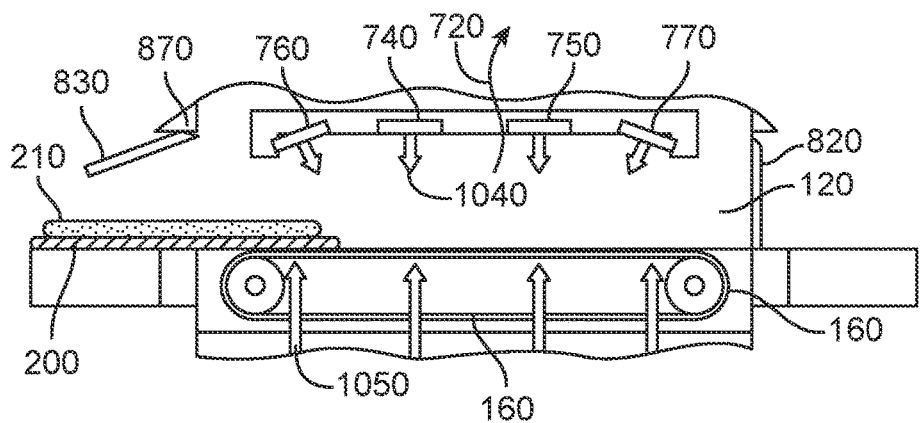

Steps of a process for cooking a pizza 1030 are shown in the schematic, sequenced drawings of FIGS. 23A-D. FIG. 23A shows the temperature-controlled pizza stone 200 automatically loaded, transported to the center of the cooking chamber 120 (pizza oven) for preheating. FIG. 23B shows the stone being returned to the input side where the fresh pizza 1030 is placed on the surface of the preheated stone 200. FIG. 23C shows the pizza 1030 being transported back into the cooking chamber 120 for processing, and FIG. 23D shows it being automatically moved out of the cooking chamber 120 for delivery. FIGS. 23A-D show that the stone heating and/or pizza cooking can be done by the infrared heat 1040 from the ceiling ceramic tile infrared burners 730 and/or by heat 1050 from the solid fuels 510 and/or the gas from below the conveyor belt 160.

Referring to FIG. 24, the computer control 1100 can include three main elements: human interface elements, namely a Mylar keyboard 1110, a VFD (Vacuum Fluorescent Display) and associated circuit board 1120, and a power board 1130 for controlled distribution of electrical power to various electrical loads.

Keyboard: The Mylar keyboard 1110 is a scanned matrix of switches arranged in electrical series circuits of rows and columns. When the operator presses a switch, the computer decodes which particular row and column the switch "belongs to" and interprets that closure as one of fourteen different selections. The primary electronic control functions are set forth in the chart shown generally at 1190 in FIG. 24A. The programming functions that the key selections can represent are: time down, time up, broil burner bank on/off, minute timer activation, all functions off, controller lock-out for child protection, time of day clock display, cooking chamber and external light control 1160, self-clean function programming and activation, combination cooking using both bake and broil burner banks 1140, 1180, fireplace burner on/off, bake burner bank on/off, and requested temperature up or temperature down.

Display: The display and associated circuit board 1130 shows the operator the time of day and the various states of operation and error conditions for the device. States of operation are broil, bake, combination (bake and broil heating elements active) cooking and self-clean operation. Error conditions may indicate, for example, a defective temperature sensor, defective keypad, cooking chamber temperature overshoot or runaway conditions.

Figure 25:
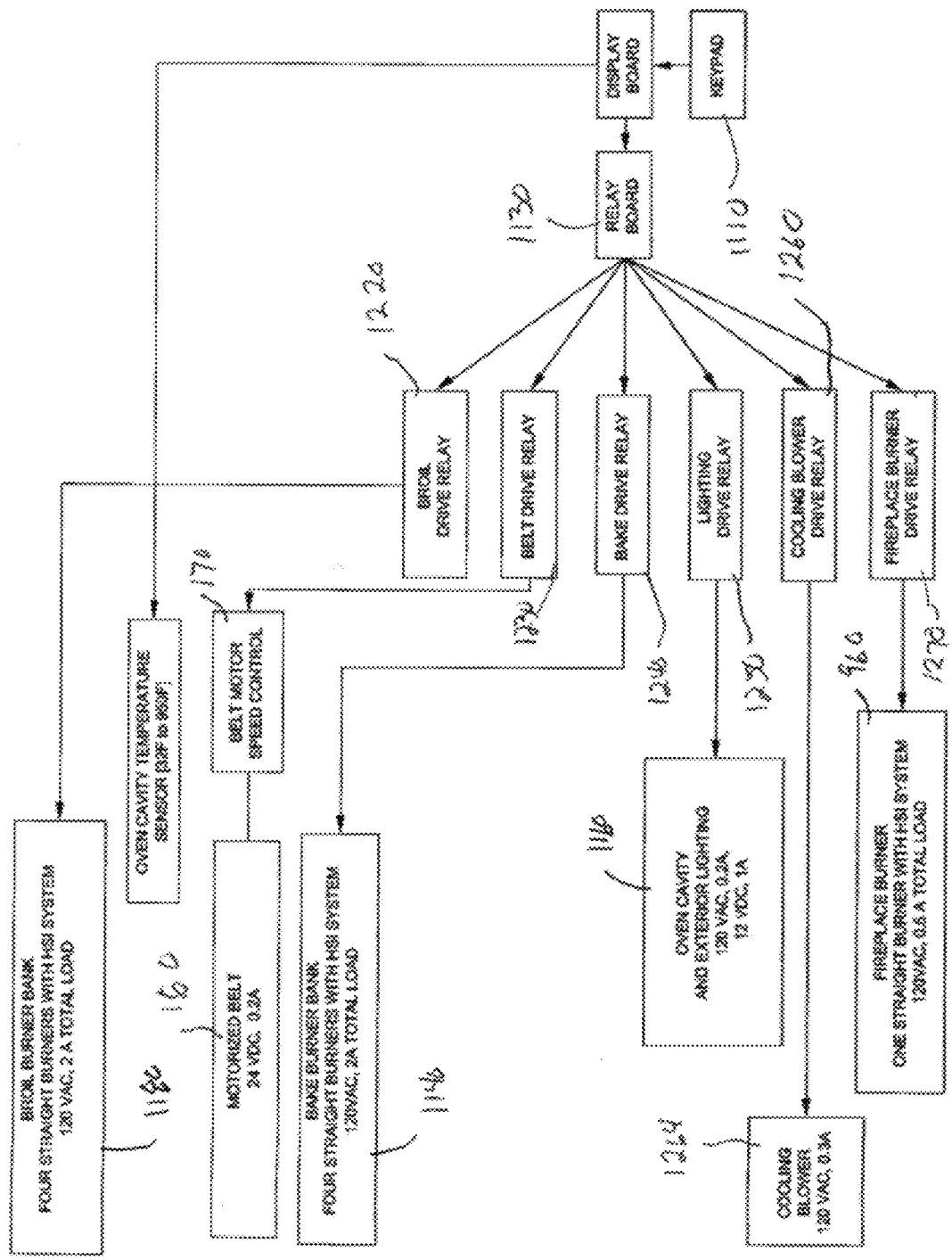
FIG. 25 is a schematic showing electronic control functions of the cooking apparatus.

Inputs and Outputs are shown with reference to FIG. 25. Inputs may include a keyboard, as described above. Input may also include a Cooking Chamber Temperature Sensor 1210, which may read between 32 F to 950 F in some embodiments. Outputs may include a VFD Board 1120, as described above. Outputs may also include a Broil Drive Relay 1220 controlling a broil burner bank 1180. Outputs may also include a Belt Drive Relay 1230 controlling the on/off state of the motorized belt motor 170. Outputs may also include a Bake Drive Relay 1240 controlling the bake burner bank 1140. Outputs may also include a Lighting Drive Relay 1250 controlling the oven cavity and exterior lighting. Outputs may also include a Cooling Blower Drive Relay 1260 controlling the electronic cooling blower 1264. Outputs may also include a Fireplace Burner Drive Relay 1270 controlling the fireplace burner 960.

Algorithms are shown with reference to FIG. 25A. Bake turns the bake burner bank 1140 (or any number of four burners) on or off to create and hold the desired temperature in the cooking chamber 120 for the desired period of time. Broil turns the broil burner bank 1180 on or off to create and hold the desired temperature (using any number of the four burners) for the desired period of time. Combination turns on both the bake burner bank 1140 and the broil burner bank 1180, to create and hold the desired temperature for the desired period of time.

Belt Motor Control 1300 energizes the belt motor 170 to rotate at a requested speed. To stop the motor 170 and open the belt drawer 110, a door switch sensing the open/closed position of the parallel-lift door 680, indicates to the motor speed controller to stop rotation, reverse direction, run for three seconds, for example, to decouple the drive clutch, stop rotation, and reverse direction again, and then waiting for further commands to resume rotation. Once the drive clutch is decoupled, the belt drawer 110 can be opened. When the belt drawer 110 is returned to the closed position, the parallel-lift door 680 must be closed, and the parallel-lift door switch detects that state and indicates that the belt motor rotation can resume operation at the requested speed.

Fireplace Burner turns the fireplace burner 960 on and off by a switch.

Clean Function allows the operator to select a time period for the self-clean task based on the amount of soil present inside the cooking chamber 120. This time period generally ranges from one to four hours in length. Once programming is complete, the computer controller alternately energizes the bake burner bank 1140 and the broil burner bank 1180, increasing the cooking chamber temperature until it reaches the programmed self-clean temperature (ranging from 650° F. to 850° F.). Once that temperature has been reached, the cooking cavity temperature is held for the operator-specified time period (proportional to the amount of soil present on the cooking cavity surfaces).

Further, the temperature-controlled burners 490 and electronic ignition 520 support the accurate application of heat and resulting temperature for a controlled amount of time to bring the cooking chamber 120 to the desired self-clean temperature and hold it at that temperature for an operator-selected period of time and thereby combust cooking residue to ash. When the cycle is complete, burners 490 are shut down. To accomplish automatic termination of the process, an exhaust gas sensor can monitor various exhaust stream gas levels ($CO_2$ and water vapor) and determine if complete combustion of cooking residues has occurred.

Another feature of the present disclosure is the ability to tighten the transport belt 160 of the cooking apparatus 100 as necessary without the need of operator intervention. The belt tightening function is done by reversing the direction of travel of the transport belt 160, which engages a drive screw and cogging element that slowly and steadily increases belt tension to a desired level. In addition to computer control, this feature not only removes operator intervention but also guarantees that the operation is performed as often as needed.

In addition to the reverse travel belt tightening system mentioned above, a less complicated version can use a spring-loaded yoke to apply force to the shaft/gear assembly which drives the belt loop, as well as maintain that force over a distance, thereby delivering tension while the belt loop expands and contracts under the application and removal of heat.

Considering the bake burner bank 1140, the broil burner bank 1180 and the fireplace burner 960, the operating state of each of these nine separate burners is controlled and monitored by a computer-based ignition module. When the main controller calls for operation of any burner, electrical power is made available to the module through the relay board 1130 and is used to operate the ignition module 520. The ignition module 1304 energizes the hot surface igniter 520 (which reaches a temperature exceeding 1850° F.), opens the gas valve 540 to ignite the air-fuel mixture, monitors flame current (proving that ignition has occurred), de-energizes the hot surface igniter, and if flame current is lost, closes the gas valve.

In some ignition module designs, it may be preferred to sequentially activate the 15 KBTU gas burners 490; that way, 60 KBTU of gas burner heat can be more safely ignited and applied to the cooking cavity incrementally (in 15 KBTU amounts). Furthermore, it may be desirable to activate just the middle burners for special cooking functions, or just the outer burners for certain "smoking" functions. In that case, an intermediate ignition sequencer 1308 or algorithm is used. This sequencer receives the "on" signal from the main computer 1312. When that occurs, four or more output lines 1316 from the ignition sequencer can energize various ignition modules in whatever order is required. This order can be sequential $\{1, 2, 3, 4\}$ or $\{1, 3, 2, 4\}$ or round robin $\{1, 2, 3, 4\}$ followed by $\{2, 3, 4, 1\}$ followed by $\{3, 4, 1, 2\}$ followed by $\{4, 1, 2, 3\}$. Since the bake or broil burner banks 1140, 1180 are routinely activated and deactivated to maintain the cooking chamber temperature requested by the operator, each ignition cycle may take a nominal five seconds to complete. This round robin control algorithm creates an even power distribution at the food deck. Otherwise, burner #1 would be active 75% longer time period than burner #4.

The controller 1320 routinely performs watchdog tasks to evaluate its own operating condition. In the event of controller hardware or software malfunction, the controller fails in a safe condition, removing electrical power from all electrical loads and indicating an error condition pertaining to the suspected cause of the fault.

Embodiments disclosed herein may include various features of the present cooking apparatus 100. Bake burners 490 to create a uniform temperature cooking chamber 120. Bake burners 490 that ignite wood 510 for cooking and flavoring of food. A drawer 410 for periodic loading of wood/charcoal 510 etc. A drawer 550 for easy capture, retention and disposal of ash 580. A front tray area 690 for food preparation and drip protection. A motorized transport belt 160 for high volume cooking. A drawer arrangement 110 to allow access to the transport belt 160 during cooking. Side swing-down doors 820, 830 which limit cold air ingress into the cooking chamber 120 thereby allowing the temperature of the cooking chamber to be accurately controlled. Illumination 1160 of the interior of the transport belt area. Illumination of the input and output areas 840, 850 of the transport belt 160. High-infrared output broilers 730. Means at a top cooking area 714 to heat, cook, and/or rethermalize food using the exhaust products of the cooking chamber 120 as a heat source. Electronic control 1100 of the speed of the transport belt 160. Electronic control of ignition and operation of the bake and broil burners 490, 730. Means 900, 910 to allow computer controlled coupling and uncoupling of the transport belt motor 170 when the drawer 110 is pulled out and into the kitchen and later replaced in the housing 130. Motor-driven transport belt cassette 140, stationary pizza stone cassette, motor-driven rotisserie cassette for cooking chicken and kabobs etc., roller cassette for hot dog cooking, a walking beam conveyor cassette for specialized cooking and other cassettes as may be apparent to those skilled in the art to deliver new heating, cooking, smoking, and searing modalities for processing food. Means 940 to operate and view a traditional fireplace flame 940 using a gas burner 960 to create ambience for pizza cooking or backyard parties.

In some embodiments, the above-noted features are summarized below. Heating from underneath the belt drawer 110 using gas fired burners 490, which may or may not include the provision for burning solid fuel 510, and which may or may not include a wood or solid fuel support drawer 410. An ash drawer 550 located below the wood or solid fuel drawer 410 to gather ashes created during the burning of wood or other solid fuels 510 in a drawer positioned below the belt drawer 110 and to create and control draft required for the solid fuel combustion process. A "parallel-lift door" or "swing-up door" 680 in combination with the belt drawer 110 allows the belt drawer to be pulled out into the kitchen space for access to food items thereon. The parallel-lift glass door 680 can have no central support structure at the bottom of the door thereby cooling air can flow upwards through the open space between the two glass panes in the door. That feature (no central support structure) allows for the aesthetic value of the "pizza oven" arch created by the upper parts of the door and the belt drawer 110 to be preserved. The door can be a swing-down door, allowing the belt drawer to be pulled into the kitchen and the door is now capable of catching drips from the belt drawer. Since the belt drawer 220 allows placement of food to be cooked at the input side of the belt 160, and removal at the output side of the belt, the swing-down doors 820, 830 at the input and output areas 840, 850 create a cooking chamber 120 for times when the conveying ability of belt drawer 110 is not used in the primary mode of cooking. The design and use of this enclosed chamber in combination with the belt drawer 220 transforms a continuous cooking device into a batch cooking device. Halogen lights or LEDs 840, 850 can shine down on the input and output areas 820, 830 of the cooking apparatus 100 (where the belt drawer 110 can be loaded and unloaded). These lights can be in temperature-controlled "clamshell" areas 860, 870, which are not only both functional and aesthetically pleasing, but advantageously are outside of the hot cooking chamber 120 and the housing 130. The clear doors 830, 840, which swing up out of the way for normal belt cooking, allow light to pass through the door glass and heated air to be spread past and away from the illumination sources 840, 850. A cooking area 714 positioned above the cooking drawer 110 and above the ceramic tile infrared burners 730 which uses the products of hot combustion as the heat source. That is, the broiler exhaust is used to cook at the top of the housing 130 on a grate 710.

Figure 27:
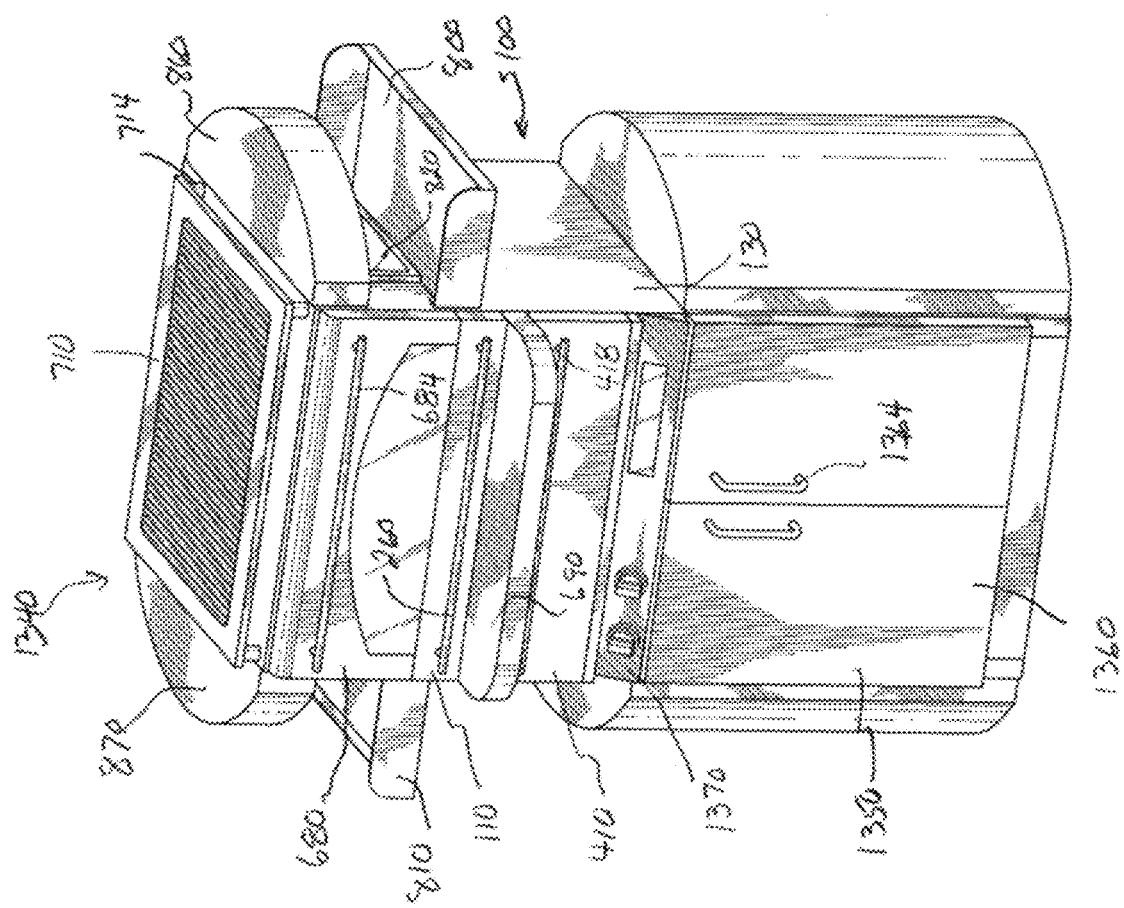
FIG. 27 is a front perspective view of a first cooking cabinet apparatus of the present disclosure.

FIG. 27 shows a cooking cabinet apparatus generally at 1340 of the present disclosure. It is essentially the above-discussed cooking apparatus 100 mounted on a storage cabinet 1350 having front doors 1360 with handles 1364. The storage cabinet 1350, in addition to providing storage space for cooking utensils and the like, also serves as a support for positioning the cooking apparatus 100 at a workable height for a standing operator. The control panel 1370 is a rearwardly-angled front panel between the top of the doors 1360 and the cooking apparatus 100

Figure 28:
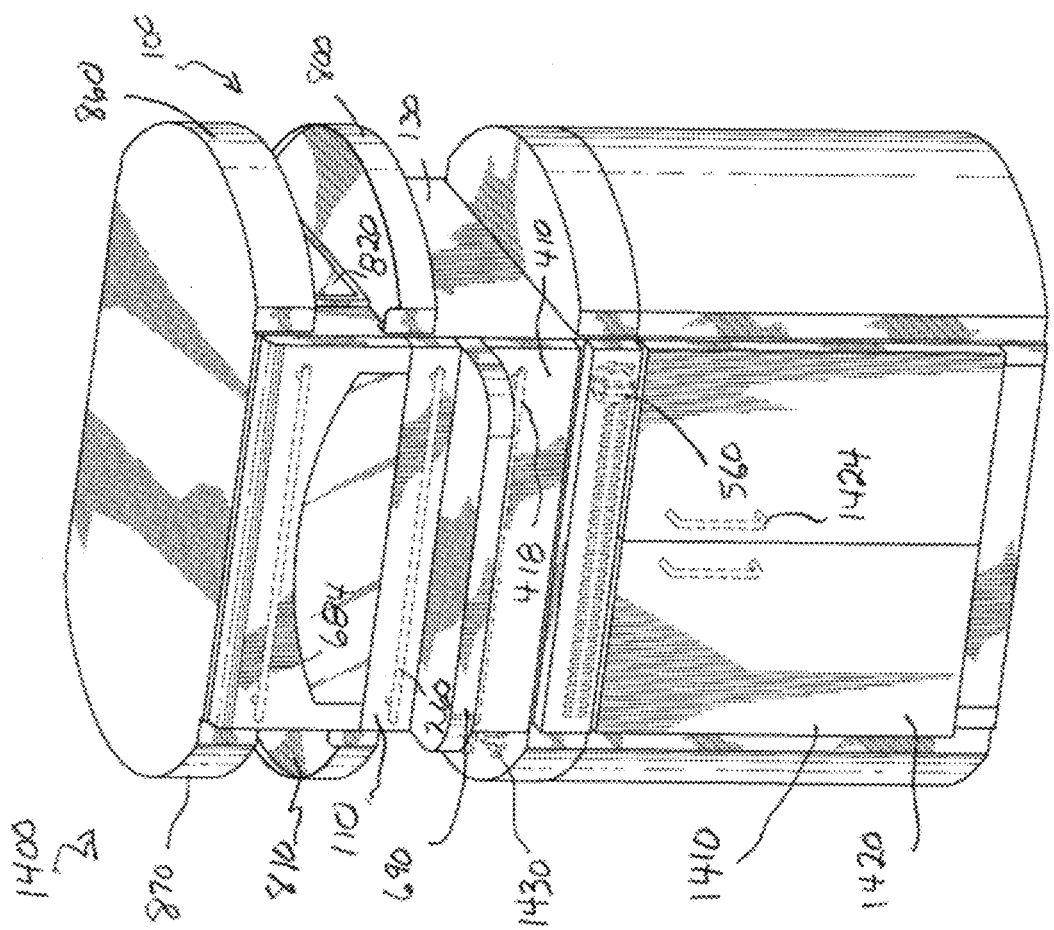
FIG. 28 is a front perspective view of a second cooking cabinet apparatus of the present disclosure.

FIG. 28 shows an alternative cooking cabinet apparatus at 1400, which includes a cooking apparatus 100, and a supporting storage cabinet 1410 having cabinet front doors 1420 with handles 1424. The control panel 1430 for this embodiment is on the left side shelf. FIG. 28 depicts an alternative embodiment without a top warming area and grate.

Figure 29:
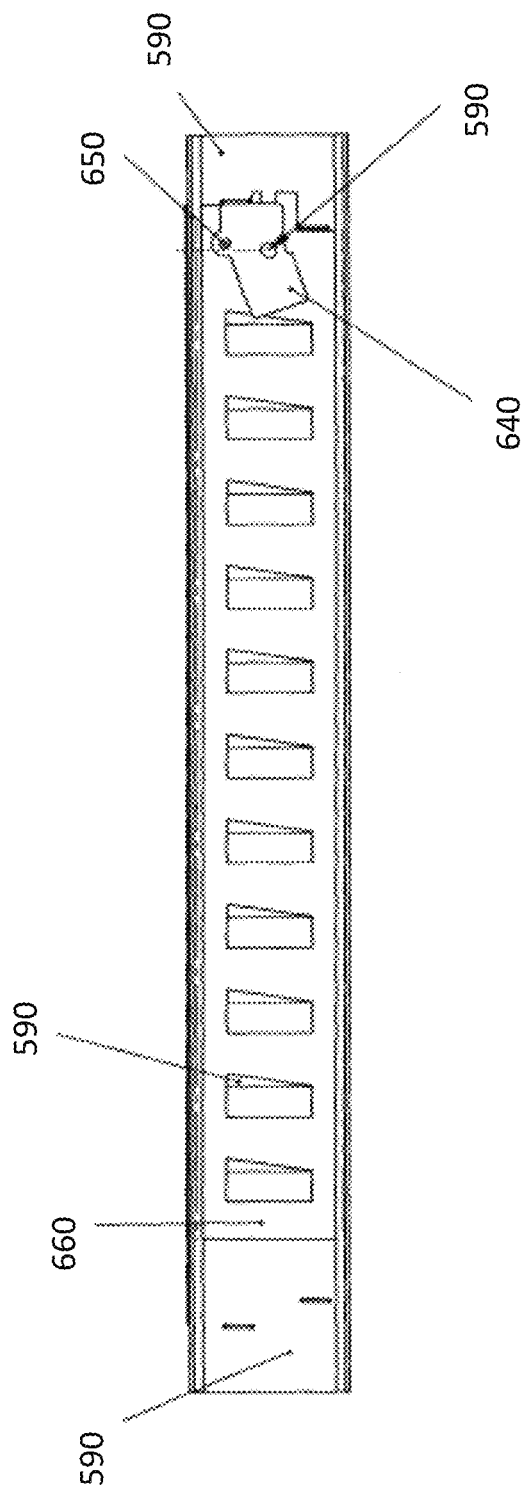
FIG. 29 is a front elevation view of an alternative front frame element of the ash drawer of FIG. 16.

In another embodiment of the frame front 590, (see FIG. 29), when the shaft 630 is rotated clockwise or counterclockwise, cam 640, which is attached to the shaft, is also rotated. Pin 650 attached to cam 640 moves on a circular arc with the body of the pin retained in a circular slot located on moving shutter 660. Pin 650 mates with a circular slot on the shutter 660 designed to force shutter 660 to move in a lateral direction. When shutter 660 is moved in a lateral direction, the area available for air flow to the solid fuel drawer through shutter 660 is increased or decreased. Features on cam 640 provide positive stops in the fully open and fully closed. Similar air shutter, cam, pin, and circular slot elements are located at the back of the drawer to provide the same control of the shutter open area at the back 600 of the drawer 550 as created at the front 590 of the drawer 550.

Although the present inventions have been described in terms of preferred and alternative embodiments above, numerous modifications and/or additions to the above-described embodiments would be readily apparent to one skilled in the art. The embodiments can be defined as methods of use or assembly (or disassembly) carried out by anyone, any subset of or all of the components and/or users; as systems of one or more components in a certain structural and/or functional relationship; and/or as subassemblies or sub-methods. The inventions can include each of the individual components separately, or sub-assemblies thereof. However, it is intended that the scope of the present inventions extend to all such modifications and/or additions and that the scopes of the present inventions are limited solely by the claims set forth herein.

Individual elements or features of a particular aspect of the present teachings are generally not limited to that particular aspect, but, where applicable, are interchangeable and can be used in other aspects, even if not specifically shown or described. The same may also be varied in many ways. Such variations are not to be regarded as a departure from the present teachings, and all such modifications are intended to be included within the scope of the present teachings.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including" and "having" are inclusive and therefore specify the presence of stated features, integers, steps, operations, elements and/or components, but do not preclude the presence or addition of one or more other features, integers, steps, operations, elements, components and/or groups thereof. The method steps, processes and operations described herein are not to be construed as necessarily requiring their performance in the particular order discussed or illustrated, unless specifically identified as an order of performance. It is also to be understood that additional or alternative steps may be employed.

Although the terms first, second, third and so forth may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second" and other numerical terms when used herein do not imply a sequence or order unless clearly indicated by the context. Thus, a first element, component, region, layer or section discussed below can be termed a second element, component, region, layer or section without departing from the aspects of the present teachings.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (such as "between" versus "directly between," and "adjacent" versus "directly adjacent"). As used herein, the term "and/or" includes any and all combinations of one or more of the associated listed items.

Spatially relative terms, such as "inner," "outer," "beneath," "below," "lower," "upper," "above," "forward," "rearward," "front" and "back" may be used herein for ease of description to describe one element's or feature's relationship to another, but the disclosure is intended to encompass different orientations of the assembly in use or operation in addition to the orientation depicted in the figures. For example, if the assembly in the figures is turned over, elements described as "below" or "beneath" other elements or features would then be oriented "above" the other elements or features. Thus, the example term "below" can encompass both an orientation of above and below. The assembly may be otherwise oriented (rotated ninety degrees or at other orientations) and the spatially relative descriptors used herein interpreted accordingly.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A cooking apparatus, comprising:
   a housing;
   a conveyor belt drawer movable between open and closed positions relative to the housing;
   the conveyor belt drawer including a conveyor belt configured to transport a food item thereon from one end of the drawer to another;
   an energy source for cooking items disposed in the conveyer belt drawer; and
   a solid fuel support drawer which supports a solid fuel support and is movable between open and closed positions relative to the housing, wherein the solid fuel support and the solid fuel support drawer together define a solid fuel drawer assembly which includes a drawer frame, a plurality of cross bars supported by the drawer frame, and a plurality of elongate V, U or W shaped solid fuel support members suspended from the cross-bars and having through-holes.

2. The apparatus of claim 1, wherein the solid fuel support is configured to support solid fuel to be ignited by the burner to cook the food item on the conveyor belt.

3. The apparatus of claim 1 wherein the energy source is at least one of: a gas-fired burner, a straight line burner positioned underneath a fuel support member, an infrared radiation source, and a high-temperature air source.

4. The apparatus of claim 1 wherein the drawer assembly includes a front panel and a spacing and liquid flavoring tray between the front panel and the support members.

5. A cooking apparatus, comprising:
   a housing;
   a conveyor belt drawer movable between open and closed positions relative to the housing;
   the conveyor belt drawer including a conveyor belt configured to transport a food item thereon from one end of the drawer to another;
   a solid fuel support configured to support solid fuel to be ignited by the burner to cook the food item on the conveyor belt; and
   an ash drawer in the housing, below the solid fuel support, including an air flow shutter on a front or rear face thereof, and including a removable tray configured to collect ash falling from the solid fuel support.

6. The apparatus of claim 1 further comprising a dripping collection tray supported by the housing and below the conveyor belt drawer.

7. The apparatus of claim 1 further comprising the housing including a front door which when in an open position allows the conveyor belt drawer to be removed from the housing.

8. The apparatus of claim 1 wherein the housing includes an input door at an input end of the conveyor belt and an output door at an output end of the conveyor belt, wherein both the input door and the output door are configured to be open in a continuous food feed onto the conveyor belt, to the output door during a cooking process and out the input door after the cooking process, and wherein both the input door and the output door can be closed for a batch cooking process.

9. A cooking apparatus, comprising:
   a housing;
   a conveyor belt drawer movable between open and closed positions relative to the housing;

the conveyor belt drawer including a conveyor belt configured to transport a food item thereon from one end of the drawer to another; and wherein the housing includes a glass input door at an input end of the conveyor belt and a glass output door at an output end of the conveyor belt, a first light at an input area outside of the input door and configured to shine down on food being input through the input door when open including down through the open glass input door, and a second light at an output area outside of the output door and configured to shine down on food being output through the output door when open including down through the open glass output door, wherein the first light is a halogen or LED light and the second light is a halogen or LED light.

10. A cooking apparatus, comprising:

a housing;

a conveyor belt drawer movable between open and closed positions relative to the housing;

the conveyor belt drawer including a conveyor belt configured to transport a food item thereon from one end of the drawer to another; and a cooking area on a top of the housing above a cooking chamber for the conveyor belt drawer and which is heated by exhaust from the cooking chamber passing up through the cooking area to heat food items thereon, wherein the cooking area includes a removable cooking grate.

11. A cooking apparatus, comprising:

a housing;

a conveyor belt drawer movable between open and closed positions relative to the housing;

the conveyor belt drawer including a conveyor belt configured to transport a food item thereon from one end of the drawer to another;

a drive motor having a forked drive element and attached to the housing;

the conveyor belt drawer including a drive shaft for the conveyor belt and configured to be driven by the drive motor;

a forked driven element configured to drive the drive shaft; and a shroud which aligns the forked driven element with the forked drive element;

the forked driven element being configured to operatively engage the forked drive element to drive the shaft and thereby the belt and to disengage from the forked drive element when the forked drive element is rotated in an opposite direction to allow the conveyor belt drawer to be moved out relative to the housing.

12. A cooking apparatus, comprising:

a housing;

a heat source in the housing;

a drawer supported by the housing and positionable between an inserted position and a removed position; and a conveyor belt operatively positionable in the drawer and configured to convey a food item supported thereon when the drawer is in the inserted position so that the food item can be heated by the heat source and the food item can be inspected when the drawer is in the removed position outside of the housing;

wherein the heat source includes a support surface for supporting wood or solid fuel in a position below the conveyor belt, and further comprising an ash drawer positioned below the support surface and configured to gather ashes created by burning of wood or solid fuel when on the surface and to create and control draft air for combustion of the wood or solid fuel.

13. The apparatus of claim 12 further comprising a conveyor drive motor operatively connected to the conveyor belt with the drawer in the inserted position and automatically disconnected from the conveyor belt with the drawer moved out of the inserted position.

* * * * *